(12) United States Patent
Tsukagoshi

(10) Patent No.: US 10,701,403 B2
(45) Date of Patent: Jun. 30, 2020

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

(*) Notice: Subject to any disclaimer, the term of this patent is extended or adjusted under 35 U.S.C. 154(b) by 178 days.

(21) Appl. No.: 15/036,996

(22) PCT Filed: Jan. 13, 2015

(86) PCT No.: PCT/JP2015/050686
§ 371 (c)(1),
(2) Date: May 16, 2016

(87) PCT Pub. No.: WO2015/111467
PCT Pub. Date: Jul. 30, 2015

(65) Prior Publication Data
US 2016/0309201 A1 Oct. 20, 2016

(30) Foreign Application Priority Data
Jan. 24, 2014 (JP) .................................. 2014-011890

(51) Int. Cl.
*H04N 19/98* (2014.01)
*H04N 19/46* (2014.01)
(Continued)

(52) U.S. Cl.
CPC ............... *H04N 19/98* (2014.11); *H04N 5/20* (2013.01); *H04N 7/01* (2013.01); *H04N 19/136* (2014.11);
(Continued)

(58) Field of Classification Search
CPC ........ G06T 5/009; G09G 5/006; H04N 19/70; H04N 19/46; H04N 19/98
(Continued)

(56) References Cited

U.S. PATENT DOCUMENTS 6,560,285 B1  5/2003 Reitmeier et al.
6,809,761 B1 10/2004 Tamaru
(Continued)

FOREIGN PATENT DOCUMENTS

CN  105165001 A  12/2015
EP  2 993 886 A1  3/2016
(Continued)

OTHER PUBLICATIONS

U.S. Appl. No. 61/874,363, filed Sep. 2013, Oh.*
(Continued)

*Primary Examiner* — Albert Kir
(74) *Attorney, Agent, or Firm* — Oblon, McClelland, Maier & Neustadt, L.L.P.

(57) ABSTRACT

The present invention allows for display of an image generated from HDR video data on an LDR monitor in good condition. Applying a predetermined level-mapping curve to the input video data (HDR video data) in a first range of levels provides the video data for transmission (LDR video data) in a second range of levels narrower than the first range of levels. The video data for transmission is transmitted together with the auxiliary information used to convert the levels on the receiving end.

14 Claims, 21 Drawing Sheets

(51) Int. Cl.
*H04N 19/70* (2014.01)
*H04N 5/20* (2006.01)
*H04N 7/01* (2006.01)
*H04N 19/136* (2014.01)
*H04N 19/162* (2014.01)
*H04N 19/186* (2014.01)
*H04N 19/463* (2014.01)
*H04N 5/202* (2006.01)

(52) U.S. Cl.
CPC ......... *H04N 19/162* (2014.11); *H04N 19/186* (2014.11); *H04N 19/46* (2014.11); *H04N 19/463* (2014.11); *H04N 19/70* (2014.11); *H04N 5/202* (2013.01)

(58) Field of Classification Search
USPC ....... 375/240.02; 345/589; 725/116; 382/167
See application file for complete search history.

(56) References Cited

U.S. PATENT DOCUMENTS

| | | | |
|---|---|---|---|
| 9,712,781 B2* | 7/2017 | Oh | H04N 19/70 |
| 2003/0202589 A1 | 10/2003 | Reitmeier et al. | |
| 2007/0223813 A1 | 9/2007 | Segall et al. | |
| 2010/0328490 A1 | 12/2010 | Kurane et al. | |
| 2014/0079113 A1 | 3/2014 | Newton et al. | |
| 2014/0210847 A1* | 7/2014 | Knibbeler | G09G 5/006 |
| | | | 345/589 |
| 2014/0225941 A1 | 8/2014 | Van Der Vleuten et al. | |
| 2016/0080714 A1 | 3/2016 | Tsukagoshi | |
| 2017/0339433 A1* | 11/2017 | Mertens | G06T 5/009 |

FOREIGN PATENT DOCUMENTS

| | | |
|---|---|---|
| JP | 5-130413 A | 5/1993 |
| JP | 6-164410 A | 6/1994 |
| JP | 2001-8092 A | 1/2001 |
| JP | 2002-542739 A | 12/2002 |
| JP | 2007-257641 A | 10/2007 |
| JP | 2011-10108 A | 1/2011 |
| JP | 2014-532195 A | 12/2014 |
| JP | 2016-532390 A | 10/2016 |
| JP | 2016-541140 A | 12/2016 |
| WO | WO 2012/153224 A1 | 11/2012 |
| WO | WO 2013/046095 A1 | 4/2013 |

OTHER PUBLICATIONS

Extended European Search Report dated Aug. 21, 2017 in Patent Application No. 15740130.8.
Benjamin Bross, et al., "High Efficiency Video Coding (HEVC) text specification draft 10 (for FDIS & Consent)", Editor, Total 333 Pages, (Jan. 24, 2014).
International Search Report dated Apr. 7, 2015 in PCT/JP2015/050686 Filed Jan. 13, 2015.
Office Action dated Aug. 2, 2018 in Chinese Patent Application No. 201580004856.9 with English translation, 14 pages.
Combined Chinese Office Action and Search Report dated Jan. 31, 2019 in corresponding Chinese Patent Application No. 201580004856.9 (with English Translation), 14 pages.
Office Action dated Feb. 26, 2019 in corresponding Japanese Patent Application No. 2015-558805, 8 pages.
Office Action dated Jul. 9, 2019 in Japanese Patent Application No. 2015-558805 (with unedited computer generated English translation).
Japanese Office Action dated Oct. 29, 2019 in Patent Application No. 2015-558805 (with English translation), 4 pages.

* cited by examiner

FIG. 9

HDR_mapping SEI syntax

| Syntax | No. of Bits | Format |
|---|---|---|
| HDR_mapping SEI ( ) { | | |
|   HDR_mapping_id | ue(v) | |
|   HDR_mapping_refresh_flag | u(1) | |
|   if( HDR_mapping_refresh_flag ) { | | |
|     coded_data_bits | 8 | uimsbf |
|     uncompressed_peak_level_percentage | 16 | uimsbf |
|     compressed_peak_level_percentage | 16 | uimsbf |
|     level_mapping_flag | 1 | bslbf |
|     eotf_linked_flag | 1 | bslbf |
|     reserved | 6 | 0x3f |
|     if( level_mapping_flag ) | | |
|       level_mapping() | | |
|     if( eotf_linked_flag ) | | |
|       eotf_table() | | |
|   } | | |
| } | | |

FIG. 10

HDR_mapping SEI syntax

| Syntax | No. of Bits | Format |
|---|---|---|
| level_mapping ( ) { | | |
|   number_of_mapping_periods | 8 | uimsbf |
|   for ( j = 0; j < number_of_mapping_periods ; j++ ) { | | |
|     compressed_mapping_point | 16 | uimsbf |
|     uncompressed_mapping_point | 16 | uimsbf |
|   } | | |
| } | | |
| eotf_table ( ) { | | |
|   eotf_table_type_main | 4 | uimsbf |
|   reserved | 0xF | uimsbf |
|   if ( eotf_table_type_main == 0xF ) { | | |
|     for ( j = 0; j < 2 ^ coded_data_bits - 1 ; j++ ) | | |
|       tbl[ j ] | 16 | uimsbf |
|   } | | |
| } | | |

FIG. 11

```
HDR_mapping_SEI semantics

HDR_mapping_refresh_flag (1bit)
    1  MESSAGE ABOUT HDR mapping IS REFRESHED
    0  MESSAGE ABOUT HDR mapping IS NOT REFRESHED
coded_data_bits (8bits)
                                BIT LENGTH OF ENCODED DATA IS INDICATED BY VALUE
uncompressed_peak_level_percentage
                                PERCENTAGE TERM OF HIGHEST LEVEL OF SOURCE IMAGE DATA (VALUE RELATIVE TO 100 cd/m2)
compressed_peak_level_percentage
                                PERCENTAGE TERM OF HIGHEST LEVEL OF ENCODED IMAGE DATA (VALUE RELATIVE TO 100 cd/m2)
Level_mapping_flag
                                WHETHER PARAMETERS FOR LEVEL MAPPING EXIST IS INDICATED
eotf_linked_flag
                                WHETHER TO USE EOTF IN ORDER TO PERFORM LEVEL MAPPING IS INDICATED
number_of_mapping_periods       NUMBER OF LINKED LEVEL MAPPING CURVES IS INDICATED
compressed_mapping_point
                                POINT WHERE LEVEL MAPPING CURVE VARIES ON LEVEL-COMPRESSED AXIS IS
                                INDICATED WITH PERCENTAGE TERM ON ASSUMPTION THAT PERCENTAGE TERM IN
                                compressed_peak_level_percentage IS 100%
uncompressed_mapping_point
                                POINT WHERE LEVEL MAPPING CURVE VARIES ON LEVEL-UNCOMPRESSED AXIS IS
                                INDICATED WITH PERCENTAGE TERM ON ASSUMPTION THAT PERCENTAGE TERM IN
                                uncompressed_peak_level_percentage IS 100%
eotf_table_type_main
                                MAIN TYPE OF CONVERSION CURVE OF EOTF IS INDICATED
                                CURVE OF EOTF SPECIALIZED FOR SPECIFIC IMAGE IS TRANSMITTED
                                WHEN eotf_table_type IS 0xF
tbl []                          OUTPUT VALUE FROM INPUT VALUE j ON TRANSMITTED CURVE OF EOTF IS INDICATED
```

FIG. 12

HDR_information descriptor syntax

| Syntax | No. of Bits | Format |
|---|---|---|
| HDR_information descriptor ( ) { | | |
|   HDR_information descriptor_tag | 8 | bslbf |
|   HDR_information descriptor_length | 8 | bslbf |
|   HDR_mapping_SEI_existed | 1 | bslbf |
|   reserved | 7 | 0x7f |
| } | | |

FIG. 13

HDR_information descriptor semantics

- HDR_information descriptor_tag
  TAG INDICATING HDR information descriptor

- HDR_information descriptor_length
  SIZE OF BYTES FROM ELEMENT NEXT TO MAIN ELEMENT IN HDR information descriptor IS INDICATED

- HDR_mapping_SEI_existed
  WHETHER HDR mapping SEI EXIST IS INDICATED eotf_table_type_sub

|  | 1 | 2 | 3 |
|---|---|---|---|
| 1 | 1-1 | 1-2 | 1-3 |
| 2 | 2-1 | 2-2 | 2-3 |
| 3 | 3-1 | 3-2 | 3-3 | eotf_table_type_main

FIG. 17 eotf_table_type_main

1 PART AT DARK LEVEL IN IMAGE IS FINELY REPRODUCED
2 PART AT BRIGHT LEVEL IN IMAGE IS FINELY REPRODUCE
3 PART AT MIDDLE LEVEL IN IMAGE IS FINELY REPRODUCED eotf_table_type_sub 1 IMAGE IS VIEWED IN DARK ROOM
2 IMAGE IS VIEWED IN BRIGHT ROOM
3 IMAGE IS VIEWED IN ROOM WITH MODERATE BRIGHTNESS

TRANSMISSION DEVICE, TRANSMISSION METHOD, RECEPTION DEVICE, AND RECEPTION METHOD

TECHNICAL FIELD

The present invention relates to a transmission device, a transmission method, a reception device, and a reception method, and specifically relates, for example, to a transmission device that transmits video data after compressing the range of levels of the video data.

BACKGROUND ART

It is known that displaying a High Dynamic Range (HDR) image in a wide dynamic range on a Low Dynamic Range (LDR) monitor configured to display an image with normal brightness generates the clipped blacks in the dark parts and the clipped whites in the blight part of the HDR image and makes the image wholly dark. FIG. 23($a$) illustrates exemplary distribution of luminance levels of an original HDR image in a range of levels between zero and 100*N %. In this example, the values of "%" are the percentages of brightness when 100 cd/m2 is 100%. FIG. 23($b$) illustrates exemplary distribution of luminance levels of the LDR image provided by compressing the original HDR image to the LDR range. The peak luminance of the LDR image is at a lower level than the level of the peak luminance of the HDR image. This makes the LDR image wholly dark.

Gamma correction is also known. In the gamma correction, inputting data with the characteristic opposite to the characteristic of the monitor corrects the gamma characteristic of the monitor. For example, Non-Patent Document 1 describes that applying a gamma curve to input video data at levels of 0 to 100%*N (N is larger than one) provides video data for transmission, and encoding the video data for transmission generates a video stream. Then, the video stream is transmitted.

CITATION LIST

Non-Patent Document

Non-Patent Document 1: High Efficiency Video Coding (HEVC) text specification draft 10 (for FDIS & Last Call)

SUMMARY OF THE INVENTION

Problems to be Solved by the Invention

An objective of the present invention is to allow for good display of an LDR image generated from HDR video data.

Solutions to Problems

A concept of the present invention lies in a transmission device including:

a level conversion unit that provides video data for transmission in a second range of levels narrower than or equal to a first range of levels by applying a predetermined level-mapping curve to input video data in the first range of levels; and a transmission unit that transmits the video data for transmission together with auxiliary information used to convert the levels on a receiving end.

According to the present invention, the level conversion unit provides the video data for transmission in a second range of levels narrower than or equal to a first range of levels by applying a predetermined level-mapping curve to the input video data in the first range of levels. For example, the first range of levels may be between zero and N %, the N being a number larger than 100, and the second range of levels may be between zero and P %, the P being a number larger than or equal to 100 and smaller than or equal to the N.

The transmission unit transmits the video data for transmission provided by the level conversion unit together with the auxiliary information used to convert the levels on the receiving end. For example, the transmission unit may transmit a video stream provided by encoding the video data for transmission, and the auxiliary information may be inserted in a layer of the video stream.

According to the present invention as described above, for example, applying a predetermined level-mapping curve to the input video data in the first range of levels provides the video data for transmission in the second range of levels narrower than the first range of levels. Then, the video data for transmission is transmitted to the reception device. Thus, using an appropriate characteristic to the contents of the image as the predetermined level-mapping curve allows for good display of an LDR image generated from the video data for transmission. Furthermore, according to the present invention, the auxiliary information used to convert the levels on the receiving end is transmitted together with the video data for transmission. This enables, for example, the receiving end to appropriately convert the levels of the video data for transmission in accordance with the auxiliary information, and thus to display an image in good condition.

Note that, in the present invention, for example, the auxiliary information may be the level-mapping curve information and/or the electro-optical conversion characteristic information. In this example, the receiving end can reproduce an HDR video data for an HDR monitor from the video data for transmission in accordance with the level-mapping curve information, and thus can display an HDR image in good condition.

Furthermore, the receiving end, for example, can convert the levels of the video data for transmission or the levels of the video data provided by mapping the levels of the video data for transmission in the level mapping in accordance with the level-mapping curve information into the levels suitable for the gamma characteristic of the monitor in accordance with the electro-optical conversion characteristic information (in electro-optical conversion). Thus, an image can be displayed in good condition.

For example, the electro-optical conversion characteristic information that the transmission unit transmits together with the video data for transmission may include information of a plurality of electro-optical conversion characteristics. In this example, for example, the receiving end can automatically or manually select an electro-optical conversion characteristic suitable for the brightness of the environment in which the image is viewed among a plurality of electro-optical conversion characteristics and use the selected electro-optical conversion characteristic. This enables the receiving end to display a high-quality image suitable for the brightness of the environment in which the image is viewed.

Furthermore, another concept of the present invention lies in a reception device including:

a reception unit that receives video data for transmission in a second range of levels narrower than or equal to a first range of levels, the video data for transmission being provided by applying a predetermined level-mapping curve to input video data in the first range of levels; and a processing unit that converts the levels of the video data for transmission in accordance with auxiliary information received together with the video data for transmission.

According to the present invention, applying a predetermined level-mapping curve to the input video data in the first range of levels provides the video data for transmission in the second range of levels narrower than or equal to the first range of levels. Then, the reception unit receives the video data for transmission in the second range of levels. The processing unit converts the levels of the video data for transmission in accordance with the auxiliary information received together with the video data for transmission.

As described above in the present invention, the levels of the video data for transmission is converted in accordance with the auxiliary information received together with the video data for transmission. Thus, the levels of the video data for transmission are appropriately converted. This appropriate conversion allows for display of an image on a monitor in good condition.

Note that, in the present invention, for example, the auxiliary information may be level-mapping curve information and/or electro-optical conversion characteristic information. In this example, for example, the HDR video data for an HDR monitor can be reproduced from the video data for transmission in accordance with the level-mapping curve information. Thus, an HDR image can be displayed in good condition. Furthermore, in this example, for example, the levels of the video data for transmission or the levels of the video data provided by mapping the levels of the video data for transmission in accordance with the level-mapping curve information in level mapping can be converted into the levels suitable for the gamma characteristic of the monitor in accordance with the electro-optical conversion characteristic information (in the electro-optical conversion). Thus, an image can be displayed in good condition.

For example, the processing unit may provide the video data for output in a third range of levels wider than the second range of levels by mapping the levels of the video data for transmission in the second range of levels in accordance with the level-mapping curve information. In such a case, for example, the first range of levels may be between zero and N %, the N being a number larger than 100, the second range of levels may be between zero and P %, the P being a number larger than or equal to 100 and smaller than or equal to the N, and the third range of levels may be between zero and Q %, the Q being a number larger than or equal to 100 and smaller than or equal to the N. In such a case, a highest level in the third range of levels may be determined in accordance with information about a highest level able to be displayed.

Furthermore, for example, the processing unit may provide video data for output by electro-optically converting the video data for transmission in the second range of levels or video data in a third range of levels wider than or equal to the second range of levels in accordance with the electro-optical conversion characteristic information in electro-optical conversion, and the video data in the third range of levels is provided by converting the levels of the video data for transmission in accordance with the level-mapping curve information.

Furthermore, for example, the electro-optical conversion characteristic information received together with the video data for transmission may include information of the electro-optical conversion characteristics, and a selection unit that selects an electro-optical conversion characteristic used in the processing unit among a plurality of electro-optical conversion characteristics. In such a case, for example, the selection unit may select an electro-optical conversion characteristic used in the processing unit among the electro-optical conversion characteristics in accordance with an output from a sensor or an input by user operation. In this example, the electro-optical conversion characteristic suitable for the brightness of the environments in which the image is viewed can automatically or manually be selected among the electro-optical conversion characteristics and used. Thus, an image suitable for the brightness of the environments in which the image is viewed can be displayed in good condition.

Effects of the Invention

The present invention allows for good display of an LDR image generated from HDR video data. Note that the effects described herein are merely examples, and the effects of the present invention are not limited to the described effects. The effects of the present invention may include an additional effect.

BRIEF DESCRIPTION OF DRAWINGS

FIG. 9 is a diagram of an exemplary structure of an HDR mapping SEI message.

FIG. 10 is a diagram of an exemplary structure of an HDR mapping SEI message.

FIG. 11 is a diagram of the contents of the main information in the exemplary structure of the HDR mapping SEI message.

FIG. 12 is a diagram of an exemplary structure of an HDR information descriptor.

FIG. 13 is a diagram of the contents of the main information in the exemplary structure of the HDR information descriptor.

FIG. 17 is an explanatory diagram of the characteristics of conversion curves indicated by the main and sub types.

MODE FOR CARRYING OUT THE INVENTION

The mode for carrying out the invention (hereinafter referred to as an "embodiment") will be described hereinafter. Note that the embodiment will be described in the following order.
1. Embodiment
2. Exemplary Variation 1. Embodiment

[Exemplary Configuration of Transmission and Reception System]

Figure 1:
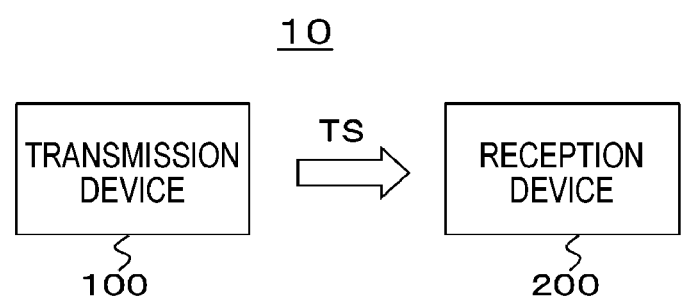
FIG. 1 is a block diagram of an exemplary configuration of a transmission and reception system as an embodiment.

FIG. 1 illustrates an exemplary configuration of a transmission and reception system 10 as the embodiment. The transmission and reception system 10 includes a transmission device 100 and a reception device 200.

The transmission device 100 generates an MPEG-2 transport stream TS as a container, and transmits the MPEG-2 transport stream TS on a broadcast wave or in packets on the Internet. The transport stream TS includes a video stream provided by encoding video data for transmission.

The video data for transmission is the video data of an LDR image provided by applying a predetermined level-mapping curve to the video data of an original HDR image that is the input video data. In the application, the range of levels of the video data for transmission is compressed from the range of levels of the input video data. However, the whole range of levels is not necessarily compressed evenly. Depending on the level-mapping curve, a low-compression range and a high-compression range are generated. The width or position of the low-compression range also varies.

Figure 2:
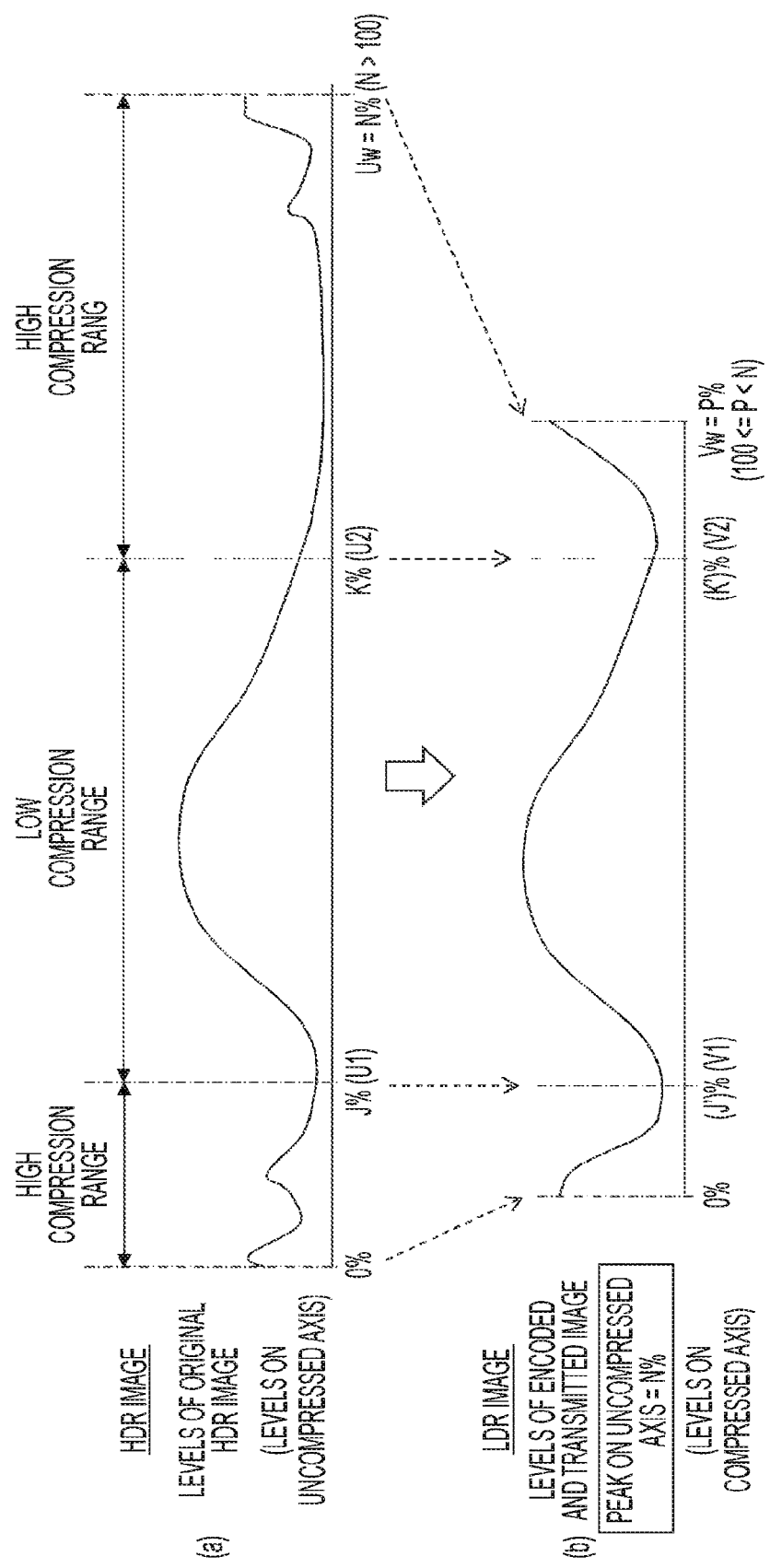
FIGS. 2(a) and 2(b) are explanatory diagrams of HDR conversion performed on a transmitting end.

In the example, the original HDR image, namely, the input video data is in a first range of levels, and the image to be transmitted, namely, the video data for transmission is in a second range of levels narrower than the first range of levels. FIG. 2(a) illustrates the levels of the original HDR image, in other words, illustrates exemplary distribution of levels of the input video data. In the example, the input video data is in a range of levels between zero and N % (N>100). FIG. 2(b) illustrates the levels of the encoded and transmitted image, in other words, illustrates exemplary distribution of levels of the video data for transmission. In the example, the video data for transmission is in a range of levels between zero to P % (100<=P<N). Note that the values of "%" indicate a value relative to 100 cd/m2 that is 100%.

The range from zero to J % of the input video data is a high-compression range. The range is converted into a range from zero to J' % of the video data for transmission with a level mapping process. The range from J to K % of the input video data is a low-compression range. The range is converted into a range from J' to K' % of the video data for transmission with the level mapping process. The range from K to N % of the input video data is a high-compression range. The range is converted into a range from K' to P % of the video data for transmission with the level mapping process.

In the example, the low-compression range is a range of levels of lightness in which the original image is transmitted with minor quality loss due to the level mapping process. On the other hand, the high-compression range is a range of levels in which the levels of the original image are proactively compressed to predetermined levels for display in the level mapping process. Selectively compressing the range of levels as described above allows for appropriate display of the darkness and brightness of the image on a display device (monitor) that is not compatible with an HDR image.

Figure 3:
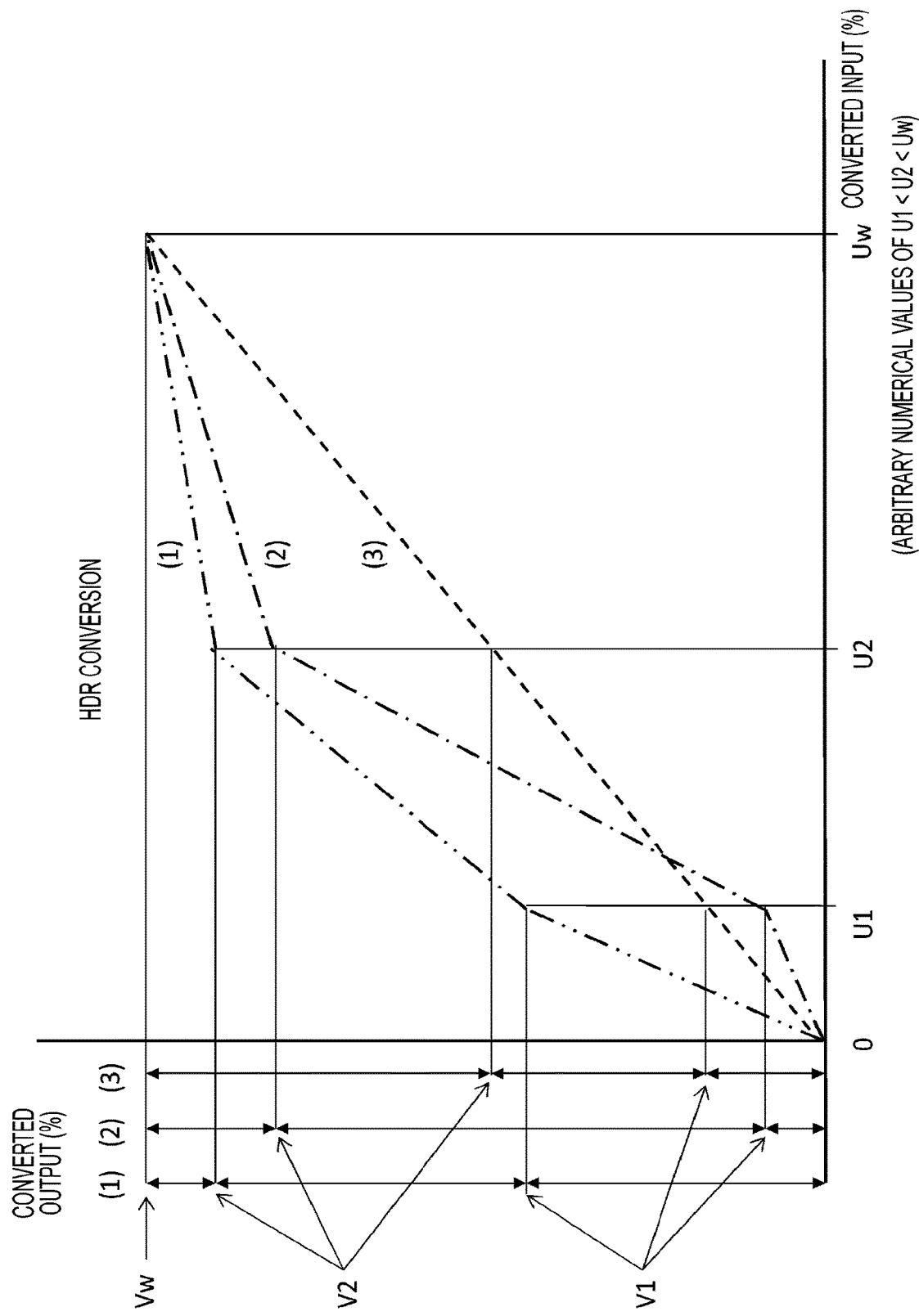
FIG. 3 is a diagram of exemplary HDR conversion characteristics (level-mapping curves).

FIG. 3 illustrates exemplary HDR conversion characteristics, namely, exemplary level-mapping curves. A level-mapping curve (1) is an example in which the dark part of an image is finely expressed. In this example, the range of levels is divided into three ranges: a dark level range, a middle level range, and a bright level range. The dark level range is converted into a range with the largest number of levels, the middle level range is converted into a range with the second largest number of levels, and the bright level range is converted into a range with a small number of levels. A level-mapping curve (2) is an example in which the part in the middle level range of the image is finely expressed. In this example, the middle level range of the three divided ranges is converted into a range with the largest number of levels, the bright level range is converted into a range with the second largest number of levels, and the dark level range is converted into a range with a small number of levels. A level-mapping curve (3) is an example in which the parts in the three level ranges of brightness of the image are evenly expressed. FIG. 3 illustrates the three linked level-mapping curves. Note that, however, the number is not limited to three.

The transmission device 100 transmits the video data for transmission together with the auxiliary information used to convert the levels of the video data on the receiving end. For example, the transmission device 100 inserts the level-mapping curve information and/or the electro-optical conversion characteristic information as the auxiliary information into a layer of the video stream.

The level-mapping curve information includes, for example, the percentage term of the peak level of brightness on an uncompressed axis (see "Uw" in FIG. 3), the percentage terms of levels of mapping points in the range to the percentage term of the peak level on the uncompressed axis (see "U1 and U2" in FIG. 3), the percentage term of the peak level of brightness on a level-compressed axis (see "Vw" in FIG. 3), and the percentage terms of levels of mapping points in the range to the percentage term of the peak level on the level-compressed axis (see "V1 and V2" in FIG. 3). The electro-optical conversion characteristic information includes, for example, the type of the electro-optical conversion characteristic, or the value of a lookup table (LUT) indicating the electro-optical conversion characteristic.

The reception device 200 receives the transport stream TS transmitted from the transmission device 100 on a broadcast wave or in packets on the Internet. The transport stream TS includes the video stream provided by encoding the video data for transmission. The reception device 200 provides the video data for display (video data for output), for example, by a process for decoding the video stream.

As described above, the level-mapping curve information and/or the electro-optical conversion characteristic information are inserted as the auxiliary information in the layer of the video stream. The reception device 200 generates the video data of the HDR image to be replayed by reversely converting the video data for transmission in HDR reverse conversion that is opposite to the HDR conversion by the transmission device 100 in accordance with the level-mapping curve information.

The range of levels of the video data of the HDR image to be replayed is a third range of levels wider than or equal to the second range of levels that is the range of levels of the video data for transmission. The highest level (peak level) of the video data of the HDR image to be replayed is limited, for example, to the highest level (peak level) of the video data of the original HDR image or the highest level (peak level) that the receiving function defines as the highest level to display.

Figure 4:
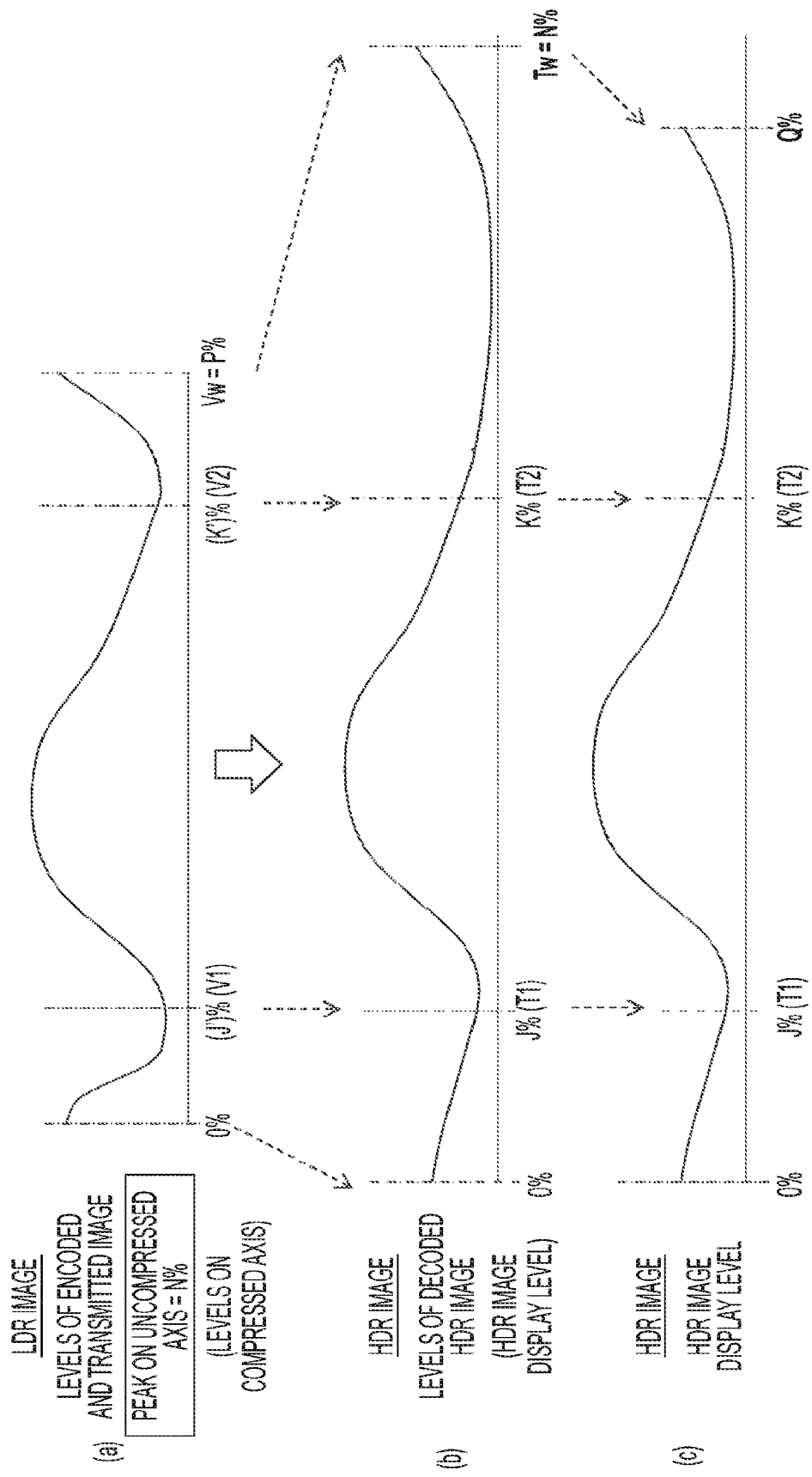
FIGS. 4(a) to 4(c) are explanatory diagrams of HDR reverse conversion performed on the receiving end.

Similarly to FIG. 2(b), FIG. 4(a) illustrates exemplary levels of the encoded and transmitted image, namely, exemplary level distribution of the video data for transmission. In this example, the video data for transmission is in a range of levels between zero and P % (100<=P<N). FIG. 4(b) illustrates exemplary distribution of levels of the video data of the HDR image provided by reversely converting the video data for transmission in conversion opposite to the HDR conversion on the transmitting end in accordance with the level-mapping curve information. Similarly to the video data of the original HDR image, the video data of the HDR image in this example is in a range of levels between zero and N % (N>100).

Figure 5:
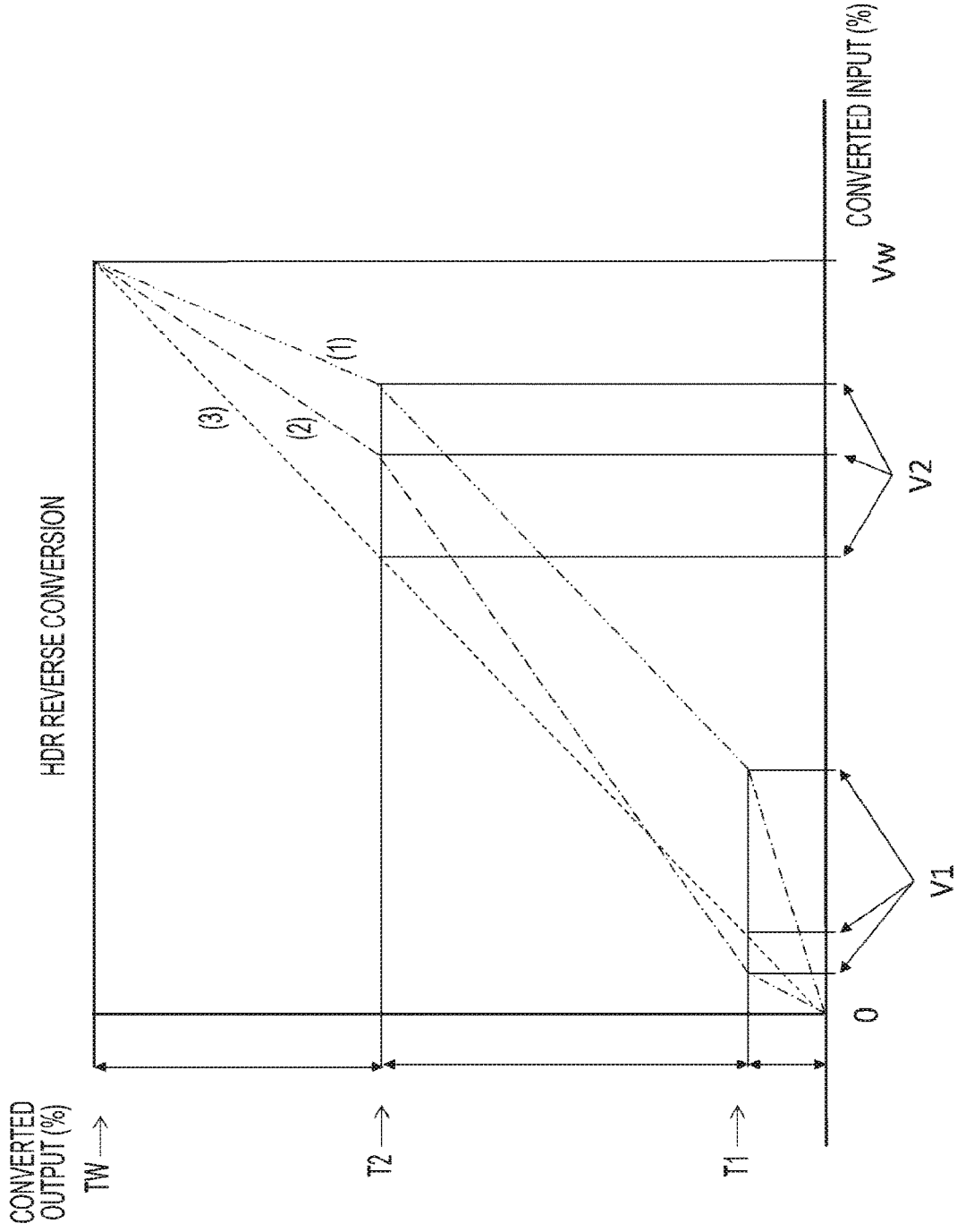
FIG. 5 is a diagram of exemplary HDR reverse conversion characteristics (level-mapping curves).

FIG. 5 illustrates exemplary HDR reverse conversion characteristics in accordance with the level-mapping curve information. The HDR reverse conversion characteristics (1), (2), and (3) correspond to the level-mapping curves (1), (2), and (3) in FIG. 3, respectively.

In the present embodiment, the highest level of the video data of the HDR image to be replayed, provided by the HDR reverse conversion, is determined as described below depending on the magnitude relationship between the highest level of the video data of the original HDR image (N %) and the highest level that the receiving function defines as the highest level to display (Q %). In other words, when P<Q<N holds, the highest level of the video data of the HER image to be replayed is Q %. When P<N<Q holds, the highest level of the video data of the HDR image to be replayed is N %.

FIG. 4(b) illustrates the distribution of levels of the video data of the HDR image to be replayed when the highest level of the video data of the HDR image to be replayed is N %. In this example, the range of levels of the video data for transmission from zero to J' % is converted into the range of levels of the HDR image to be replayed from zero to J % in the HDR reverse conversion. The range of levels of the video data for transmission from J' to K' % is converted into the range of the video data of the HDR image to be replayed from J to K % in the HDR reverse conversion.

The range of levels of the video data for transmission from K' to P % is converted into the range of levels of the video data of the HDR image to be replayed from K to N % in the HDR reverse conversion. In this example, in order to display a part at a high level value in the HDR image to be replayed, the high level value of the part in the video data of the HDR image to be replayed is provided by multiplying the high level value of the part in the video data for transmission by the ratio (N−K)/(P−K').

FIG. 4(c) illustrates the distribution of levels of the video data of the HDR image to be replayed when the highest level of the video data of the HDR image to be replayed is Q %. In this example, the range of levels of the video data for transmission from zero to J' % is converted into the range of levels of the video data of the HDR image to be replayed from zero to J % in the HDR reverse conversion. The range of levels of the input video data from J' to K' % is converted into the range of levels of the video data of the HDR image to be replayed from J to K % in the HDR reverse conversion.

The range of levels of the input video data from K' to P % is converted into the range of levels of the video data of the HDR image to be replayed from K to Q % in the HDR reverse conversion. In this example, in order to display a part at a high level value in the HDR image to be replayed, the high level value of the part in the video data of the HDR image to be replayed is provided by multiplying the high level value of the part in the video data for transmission by the ratio (Q−K)/(P−K').

The reception device 200 generates the video data for display (video data for output) by converting the video data for transmission or the video data of the HDR image provided by reversely converting the video data for transmission in the HDR reverse conversion in accordance with the electro-optical conversion characteristic information in an electro-optical conversion process.

Figure 6:
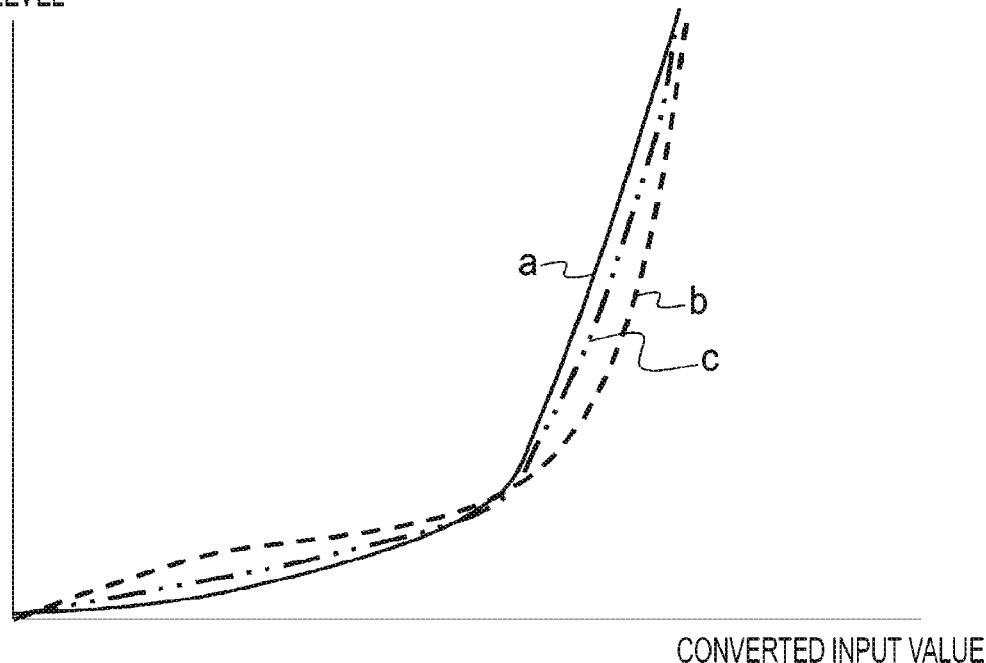
FIG. 6 is a diagram of exemplary electro-optical conversion characteristics.

FIG. 6 illustrates exemplary electro-optical conversion characteristics. A curve a indicates an exemplary electro-optical conversion characteristic used to display a part at low luminance with a high degree of accuracy. A curve b indicates an exemplary electro-optical conversion characteristic used to roughly display a part at extremely low luminance and display a part at another luminance with a high degree of accuracy. A curve c indicates an exemplary electro-optical conversion characteristic used to display an image while keeping a good balance between the part at high luminance and the part at low luminance in the image. Note that the opto-electronic conversion characteristic used in the transmission device 100 is usually opposite to the electro-optical conversion characteristic used in the reception device 200.

"Exemplary Configuration of Transmission Device"

Figure 7:
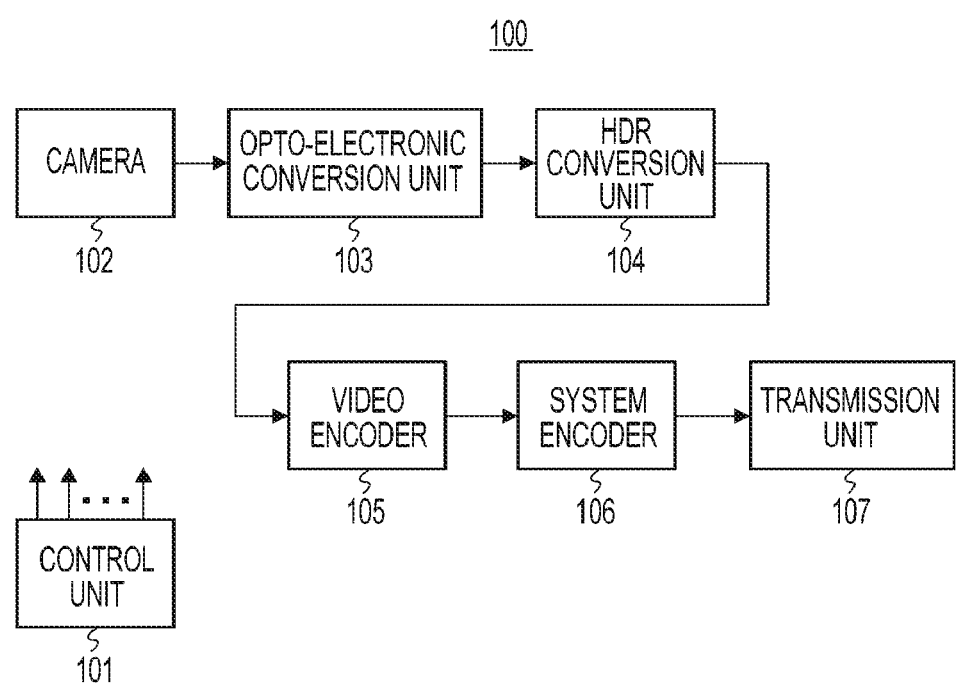
FIG. 7 is a block diagram of an exemplary configuration of a transmission device.

FIG. 7 is an exemplary configuration of the transmission device 100. The transmission device 100 includes a control unit 101, a camera 102, an opto-electronic conversion unit 103, an HDR conversion unit 104, a video encoder 105, a system encoder 106, and a transmission unit 107. The control unit 101 includes a Central Processing Unit (CPU), and controls the operation of each unit in the transmission device 100 in accordance with the control program stored in a storage unit (not illustrated).

The camera 102 captures an image of an object and outputs the video data as a High Dynamic Range (HDR) image. The video data is in a range of levels from zero to 100% N, for example, from zero to 400%, or zero to 800%. In this example, the level of 100% corresponds to a value of white luminance of 100 cd/m2.

The opto-electronic conversion unit 103 opto-electronically converts the video data provided from the camera 102 by applying a gamma curve to the video data. The HDR conversion unit 104 generates the video data for transmission of an LDR image in a compressed range of levels (see FIGS. 2(a) and 2(b)) by converting the opto-electronically converted video data of the HDR image by applying a predetermined level-mapping curve to the video data (see FIG. 3) in HDR conversion (level mapping). By this conversion, for example, when an image input to the HDR conversion unit 104 is displayed with 12 bits or more, the image output from the HDR conversion unit 104 is displayed with 10 bits or lower. Note that, as the level-mapping curve used in this example, a predetermined level-mapping curve linked to a parameter indicating the brightness of the image is selected by an automatic operation or the user operation.

The video encoder 105 provides encoded video data by encoding the video data for transmission generated with the HDR conversion unit 104, for example, in MPEG-4 AVC, MPEG-2 video, or high Efficiency Video Coding (HEVC). The video encoder 105 generates a video stream (video elementary stream) including the encoded video data, using a stream formatter provided on the downstream (not illustrated).

Meanwhile, the video encoder 105 inserts the auxiliary information into a layer of the video stream. The auxiliary information is used to convert the levels on the receiving end. The auxiliary information is the information about the level-mapping curve used in the HDR conversion unit 104, and the electro-optical conversion characteristic information. The electro-optical conversion characteristic indicated in the electro-optical conversion characteristic information depends on the characteristics of the image and is selected by automatic operation or the user operation.

The system encoder 106 generates a transport stream TS including the video stream generated with the video encoder 105. The transmission unit 107 transmits the transport stream TS on a broadcast wave or in packets on the Internet to the reception device 200.

Meanwhile, the system encoder 106 can insert the identification information, which indicates that the auxiliary information (the information about the level-mapping curve and the electro-optical conversion characteristic information) used to convert the levels on the receiving end is inserted in the layer of the video stream, into a layer of the transport stream TS. In such a case, the system encoder 106 inserts the identification information, for example, under a video elementary loop (Video ES loop) of a Program Map Table (PMT) included in the transport stream TS.

The operation of the transmission device 100 illustrated in FIG. 7 will briefly be described. The camera 102 captures an image and provides the video data of the HDR image. Then, the opto-electronic conversion unit 103 opto-electronically converts the video data of the HDR image by applying the gamma curve to the video data of the HDR image, and transmits the opto-electronically converted video data to the HDR conversion unit 104. The HDR conversion unit 104 generates the video data for transmission of an LDR image by converting the opto-electronically converted video data of the HDR image by applying a predetermined level-mapping curve to the opto-electronically converted video data of the HDR image in HDR conversion (see FIGS. 2(a) and (b)).

The video data for transmission of the LDR image generated with the HDR conversion unit 104 is provided to the video encoder 105. The video encoder 105 generates a video stream (video elementary stream) including encoded video data by encoding the video data for transmission of the LDR image, for example, in HEVC. Meanwhile, the video encoder 105 inserts the auxiliary information (the information about the level-mapping curve and the electro-optical conversion characteristic information) used to convert the levels on the receiving end into a layer of the video stream.

The video stream generated with the video encoder 105 is provided to the system encoder 106. The system encoder 106 generates an MPEG-2 transport stream TS including the video stream. The transmission unit 107 transmits the transport stream TS on a broadcast wave or in packets on the Internet to the reception device 200.

[Auxiliary Information, Identification Information, and TS structure]

As described above, the auxiliary information (the information about the level-mapping curve and the electro-optical conversion characteristic information) is inserted in the layer of the video stream. For example, when HEVC is used as the encoding scheme, the auxiliary information is inserted as an HDR mapping SEI message (HDR mapping SEI message) in the part of "SEIs" in the access unit (AU).

Figure 8:
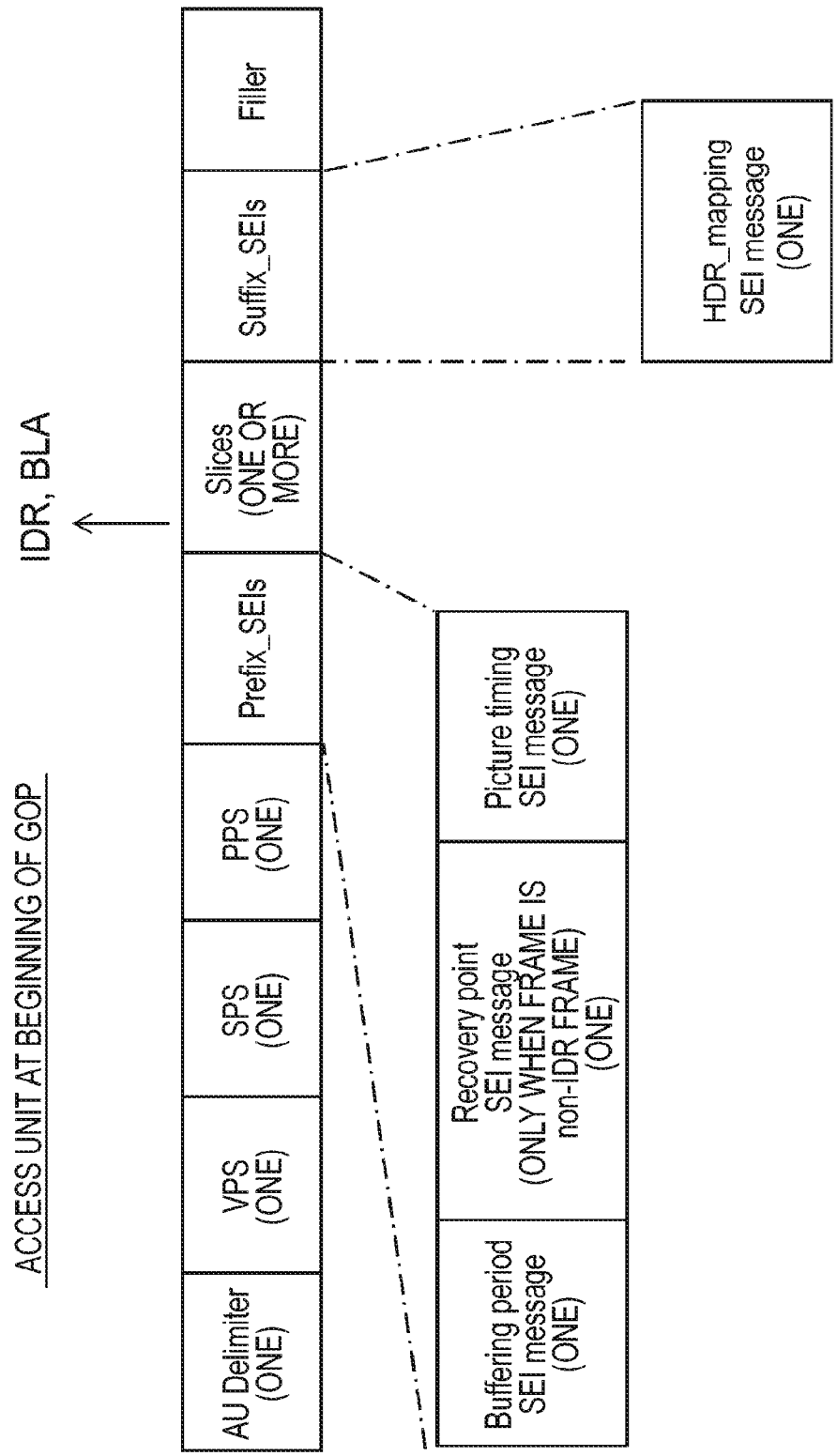
FIG. 8 is a diagram of the access unit at the beginning of a GOP when the coding scheme is HEVC.

FIG. 8 illustrates the access unit at the beginning of a Group Of Pictures (GOP) when HEVC is used as the encoding scheme. When HEVC is used as the encoding scheme, an SEI message group "Prefix_SEIs" used for decoding is placed before "slices" in which pixel data is encoded, and an SEI message group "Suffix_SEIs" used for display is placed after the "slices". The HDR mapping SEI message is placed as the SEI message group "Suffix_SEIs".

FIG. 9 and FIG. 10 illustrate an exemplary structure (Syntax) of the "HDR_mapping SEI message". FIG. 11 illustrates the contents of the main information in the exemplary structure (Semantics). The "HDR_mapping_refresh_flag" is the one-bit flag information. The "1" indicates that the previous message about HRD mapping is refreshed. The "0" indicates that the previous message is not refreshed.

When the "HDR_mapping_refresh_flag" is "1", the following information exists. The eight-bit field of "coded_data_bits" indicates the bit length of encoded data with values. The 16-bit field of "uncompressed_peak_level_percentage" indicates the percentage term of the highest level of the source image data (the value relative to 100 cd/m2), for example, the value of "Uw" in FIG. 3. The 16-bit field of "compressed_peak_level_percentage" indicates the percentage term of the highest level of the encoded image data (the value relative to 100 cd/m2), for example, the value of "Vw" in FIG. 3.

The "level_mapping_" is the one-bit flag information indicating whether the parameters for level mapping exist. The "1" indicates that the parameters for level mapping exist. The "eotf_linked_flag" is the one-bit flag information indicating whether to use the conversion curve of the electro-optical conversion (EOTF) in order to perform the level mapping. The "1" indicates that the conversion curve of the electro-optical conversion (EOTF) is used to perform the level mapping.

When the "level_mapping_flag" is "1", the following information exists. The eight-bit field of "number_of_mapping_periods" indicates the number of linked level-mapping curves. For example, the number of linked level-mapping curves is three in FIG. 3. The 16-bit field of "compressed_mapping_point" indicates a point where the level-mapping curve varies on the level-compressed axis with the percentage term on the assumption that the "compressed peak level percentage" is 100%. For example, the point is the value of "V1, V2, or Vw" in FIG. 3. The 16-bit field of "uncompressed_mapping_point" indicates a point where the level-mapping curve varies on the level-uncompressed axis with the percentage term on the assumption that the "uncompressed_peak_level_percentage" is 100%. For example, the point is the value of "U1, U2, or Uw" in FIG. 3.

When the "eotf_linked_flag" is "1", the following information exists. The four-bit field of "eotf_table_type_main" indicates the main type of the conversion curve of the electro-optical conversion (EOTF), and indicates that a conversion curve of the electro-optical conversion (EOTF)

specialized for a specific image is transmitted when the "eotf_linked_flag" is "0×F". The 16-bit field of "tbl [j]" indicates the output value from the input value "j" on the transmitted conversion curve of the electro-optical conversion (EOTF).

FIG. 12 illustrates an exemplary structure (Syntax) of an HDR information descriptor (HDR information descriptor) as the identification information. FIG. 13 illustrates the contents of the main information in the exemplary structure (Semantics).

The eight-bit field of "HDR_information descriptor tag" indicates the type of the descriptor, and indicates that the type is the HDR information descriptor in this example. The eight-bit field of "HDR_information descriptor length" indicates the length (size) of the descriptor, and indicates the number of subsequent bytes as the length of the descriptor.

The one-bit field of "HDR_mapping SEI existed" is the flag information indicating whether the HDR mapping SEI information exists in a video layer (a layer of the video stream). The "1" indicates that the HDR mapping SEI information exists while the "0" indicates that the HDR mapping SEI information does not exist.

Figure 14:
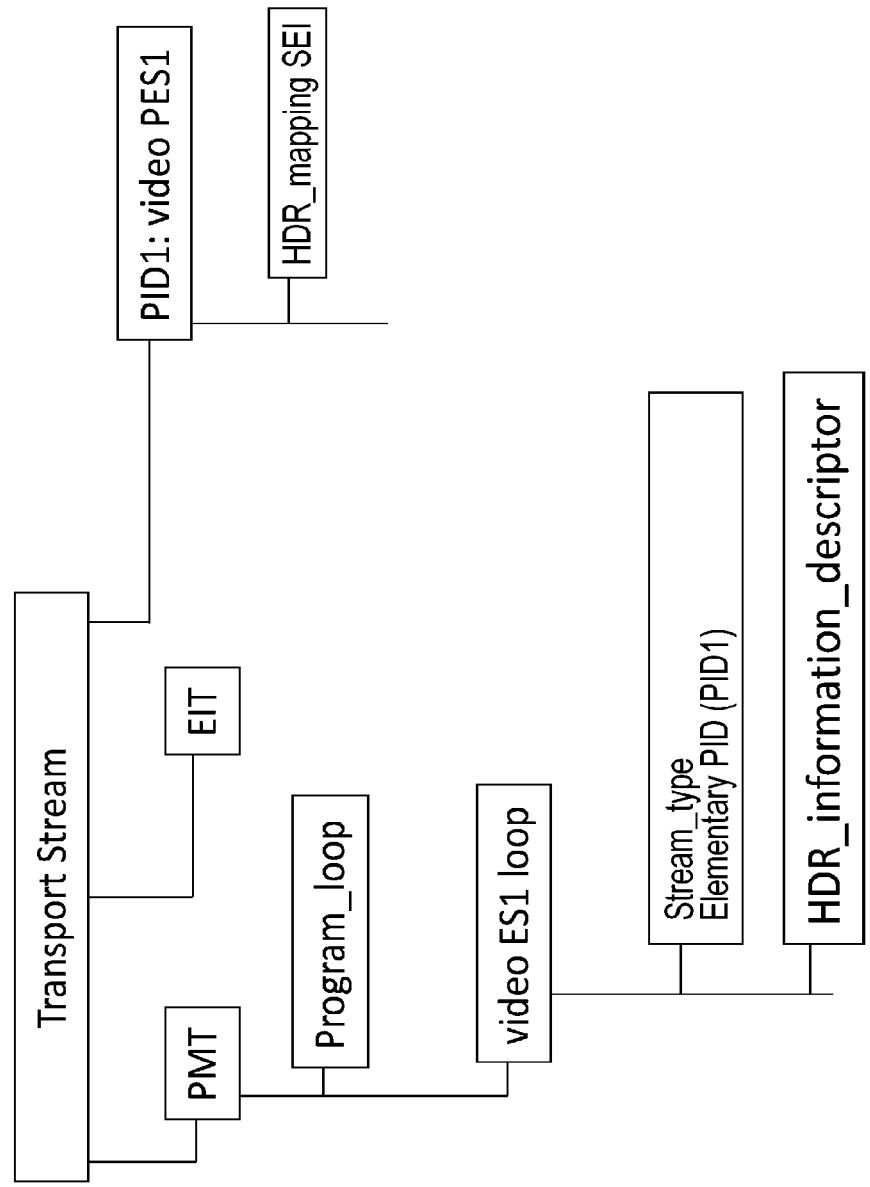
FIG. 14 is a diagram of an exemplary structure of a transport stream.

FIG. 14 illustrates an exemplary structure of the transport stream TS. The transport stream TS includes a PES packet "PID1:video PES1" of the video elementary stream. The HDR mapping SEI message (HDR mapping SEI message) is inserted in the video elementary stream.

The transport stream TS further includes a Program Map Table (PMT) as the Program Specific Information (PSI). The PSI indicates which program each elementary stream included in the transport stream belongs to. The transport stream TS further includes an Event Information Table (EIT) as the Serviced Information (SI) used to manage each event (program).

An elementary loop including the information related to each elementary stream exists in the PMT. In this exemplary structure, a video elementary loop (Video ES loop) exists. The information, for example, about the type of the stream and a packet identifier (PID) is placed in the video elementary loop, corresponding to each video elementary stream, and the descriptor indicating the information related to the video elementary stream is also placed.

The HDR information descriptor (HDR information descriptor) is placed under the video elementary loop (Video ES loop) in the PMT. The descriptor indicates whether the HDR mapping SEI information is inserted in the video stream as described above.

"Exemplary Configuration of Reception Device"

Figures 15, 16:
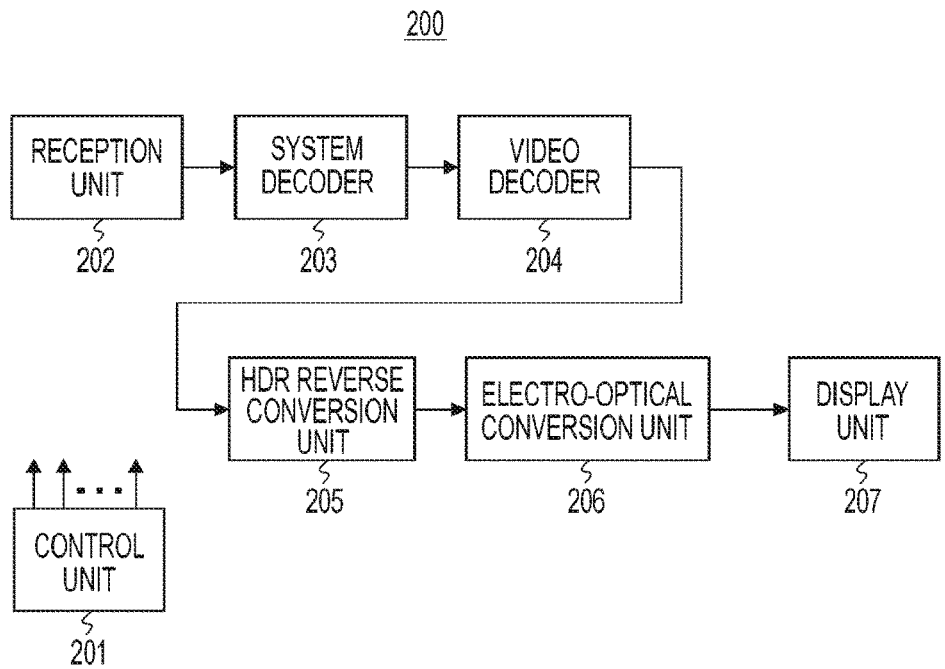
FIG. 15 is a block diagram of an exemplary configuration of a reception device.
FIG. 16 is a diagram of exemplary combinations of a main type indicated in the information "eotf_table_type_main" and a sub type indicated in the information "eotf_table_type_sub".

FIG. 15 illustrates an exemplary configuration of the reception device 200. The reception device 200 includes a control unit 201, a reception unit 202, a system decoder 203, a video decoder 204, an HDR reverse conversion unit 205, an electro-optical conversion unit 206, and a display unit 207. The control unit 201 includes a Central Processing Unit (CPU), and controls each unit in the reception device 200 in accordance with the control program stored in a storage unit (not illustrated).

The reception unit 202 receives the transport stream TS transmitted from the transmission device 100 on a broadcast wave or in packets on the Internet. The system decoder 203 extracts a video stream (elementary stream) from the transport stream TS. When the identification information, which indicates that the auxiliary information (the information about the level-mapping curve and the electro-optical conversion characteristic information) is inserted, is inserted in the layer of the transport stream TS, the system decoder 203 extracts and transmits the identification information to the control unit 201.

From the identification information, the control unit 201 can recognize that the auxiliary information (the information about the level-mapping curve and the electro-optical conversion characteristic information), namely, the HDR mapping SEI message (HDR_mapping SEI message) is inserted in the video stream. Based on the recognition, the control unit 201 can control, for example, the video decoder 204 to actively acquire the HDR mapping SEI message.

The video decoder 204 provides the baseband video data (video data for transmission) by decoding the video stream extracted by the system decoder 203 in a decoding process. The video decoder 204 extracts the SEI messages inserted in the video stream and transmits the SEI messages to the control unit 201. The SEI messages include the HDR mapping SEI message (HDR_mapping SEI message). The control unit 201 controls the decoding process or a displaying process in accordance with the SEI messages.

The HDR reverse conversion unit 205 generates the video data of the HDR image to be replayed in an extended range of levels by reversely converting the video data for transmission provided by the video decoder 204 in accordance with the level-mapping curve information included in the HDR mapping SEI message in HDR reverse conversion (see FIGS. 4(a) to 4(c)). In the HDR reverse conversion, for example, when the image input to the HDR reverse conversion unit 205 is displayed with 10 bits or lower in this example, the image output from the HDR reverse conversion unit 205 is displayed with 12 bits or more.

The HDR reverse conversion unit 205 determines the highest level of the video data of the HDR image to be replayed, depending on the magnitude relationship between the highest level of the video data of the original HDR image (N %) and the highest level that the receiving function defines as the highest level to display (Q %). In other words, when Q<N holds, the highest level of the video data of the HDR image to be replayed is Q %. When N<Q holds, the highest level of the video data of the HDR image to be replayed is N %.

Note that, when the HDR mapping SEI message does not include the level-mapping curve information (level mapping parameters), the HDR reverse conversion unit 205 outputs the video data for transmission of the LDR image input from the video decoder 204 without change.

The electro-optical conversion unit 206 electro-optically converts the video data output from the HDR reverse conversion unit 205 (the video data of the HDR image to be replayed or the video data for transmission of the LDR image), in other words, maps the levels of the video data in accordance with the electro-optical conversion characteristic information included in the HDR mapping SEI message. In this example, the electro-optical conversion unit 206 uses the conversion curve of which type is indicated in the HDR mapping SEI message or the conversion curve transmitted in the HDR mapping SEI message as the conversion curve of the electro-optical conversion (EOTF). Note that, when the video data is transmitted in another method, the auxiliary information can be recognized in accordance with the signaling information included in the parameter set of the video (SPS).

As described above, the information indicating the type of the conversion curve of the electro-optical conversion (EOTF) included in the HDR mapping SEI message is "eotf_table_type_main", and the "eotf_table_type_main" indicates the main type of the conversion curve (see FIG.

10). The main type indicated in the "eotf_table_type_main" is subdivided into sub types indicated in the "eotf_table_type_sub". In other words, the electro-optical conversion unit 206 uses the conversion curve of the electro-optical conversion (EOTF) determined in accordance with both of the main type and the sub type.

FIG. 16 illustrates exemplary combinations of the main type indicated in the information "eotf_table_type_main" and the sub type indicated in the information "eotf_table_type_sub". In this example, there are three main types "1", "2", and "3", and there are three sub types "1", "2", and "3".

In this example, each of the main and sub types indicates the characteristic of the conversion curve, for example, as illustrated in FIG. 17. In other words, the main type "1" indicates the conversion curve suitable for finely reproducing the part at a dark level in the image. The main type "2" indicates the conversion curve suitable for roughly reproducing the part with extremely low luminance and clearly reproducing with another luminance in the image. The main type "3" indicates the conversion curve suitable for finely reproducing the part at a middle level in the image. On the other hand, the sub type "1" indicates the conversion curve suitable for viewing the image in a dark room. The sub type "2" indicates the conversion curve suitable for viewing the image in a bright room. The sub type "3" indicates the conversion curve suitable for viewing the image in a room with moderate brightness. Note that the number of the main or sub types is not limited to three. The characteristic of each type is not limited to the content illustrated in FIG. 17.

The information "eotf_table_type_main" is provided in the HDR mapping SEI message from the transmission device 100 as described above. On the other hand, the information "eotf_table_type_sub" is provided in the reception device 200 in accordance with the environments in which the image is viewed. In such a case, the sub type indicated in the "eotf_table_type_sub" is determined in accordance with the output from a brightness sensor or the user operation. This selects the sub type among the sub types included in the main type, and thus selects the electro-optical conversion characteristic to be used in the electro-optical conversion unit 206.

Figure 18:
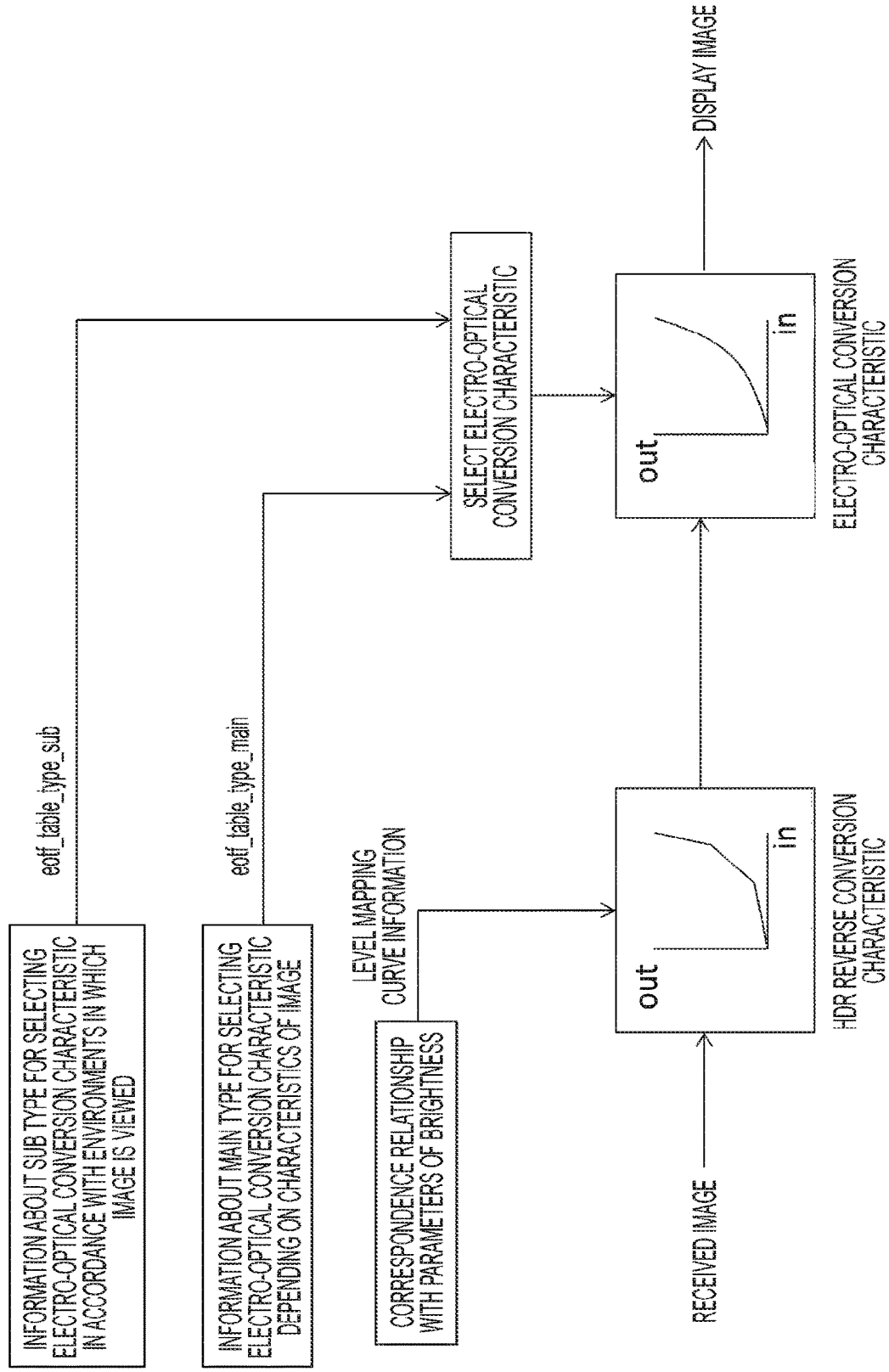
FIG. 18 is a schematic diagram of the cooperation of HDR reverse conversion and electro-optical conversion in the reception device.

FIG. 18 schematically illustrates the cooperation of the HDR reverse conversion and electro-optical conversion performed in the reception device 200. The received image is changed into an image to be displayed after being converted with the HDR reverse conversion and the electro-optical conversion. The conversion characteristic of the HDR reverse conversion corresponds to the level-mapping curve used in the HDR conversion on the transmitting end. For example, a predetermined level-mapping curve linked to the parameters indicating the brightness of the image is used on the transmitting end as described above.

The electro-optical conversion characteristic is designated with the main type indicated in the information "eotf_table_type_main" and the sub type indicated in the information "eotf_table_type_sub". The main type is set on the transmitting end, depending on the characteristics of the image. On the other hand, the sub type is set on the receiving end in accordance with the environments in which the image is viewed.

With reference to FIG. 15 again, when the HDR mapping SEI message does not include the electro-optical conversion characteristic information, the electro-optical conversion unit 206 performs the electro-optical conversion by using a conventional inverse gamma characteristic.

The display unit 207 displays the image using the video data for display output from the electro-optical conversion unit 206. The display unit 207 includes, for example, a liquid crystal display panel, and an organic EL display panel.

The operation of the reception device 200 illustrated in FIG. 15 will briefly be described. The reception unit 202 receives the transport stream TS transmitted on a broadcast wave or in packets on the Internet from the transmission device 100. The transport stream TS is provided to the system decoder 203. The system decoder 203 extracts a video stream (elementary stream) from the transport stream TS.

The video stream extracted by the system decoder 203 is provided to the video decoder 204. The video decoder 204 provides the baseband video data (video data for transmission) by decoding the video stream in a decoding process. Meanwhile, the video decoder 204 extracts the SEI messages included in the video stream and transmits the SEI messages to the control unit 201. The SEI messages include the HDR mapping SEI message (HDR_mapping SEI message). The control unit 201 controls the decoding process or a displaying process in accordance with the SEI messages.

The video data for transmission of the LDR image provided by the video decoder 204 is provided to the HDR reverse conversion unit 205. The HDR reverse conversion unit 205 generates the video data of the HDR image to be replayed in an extended range of levels by reversely converting the video data for transmission of the LDR image provided by the video decoder 204 in accordance with the level-mapping curve information included in the HDR mapping SEI message in HDR reverse conversion. Note that, when the HDR mapping SEI message does not include the level-mapping curve information, the HDR reverse conversion unit 205 outputs the video data for transmission of the LDR image input from the video decoder 204 without change.

The video data provided by the HDR reverse conversion unit 205 is provided to the electro-optical conversion unit 206. The electro-optical conversion unit 206 generates the video data for display by electro-optically converting the video data output from the HDR reverse conversion unit 205 (the video data of the HDR image to be replayed or the video data for transmission of the LDR image) in electro-optical conversion, in other words, mapping the levels of the video data in level mapping. In this example, the electro-optical conversion unit 206 uses the conversion curve of which type is indicated in the HDR mapping SEI message or the conversion curve transmitted in the HDR mapping SEI message as the conversion curve of the electro-optical conversion (EOTF). Note that, when the HDR mapping SEI message does not include the electro-optical conversion characteristic information, the electro-optical conversion is performed, for example, with a conventional inverse gamma characteristic.

The video data for display provided by the electro-optical conversion unit 206 is provided to the display unit 207. The display unit 207 displays the image of the video data for display.

Figure 19:
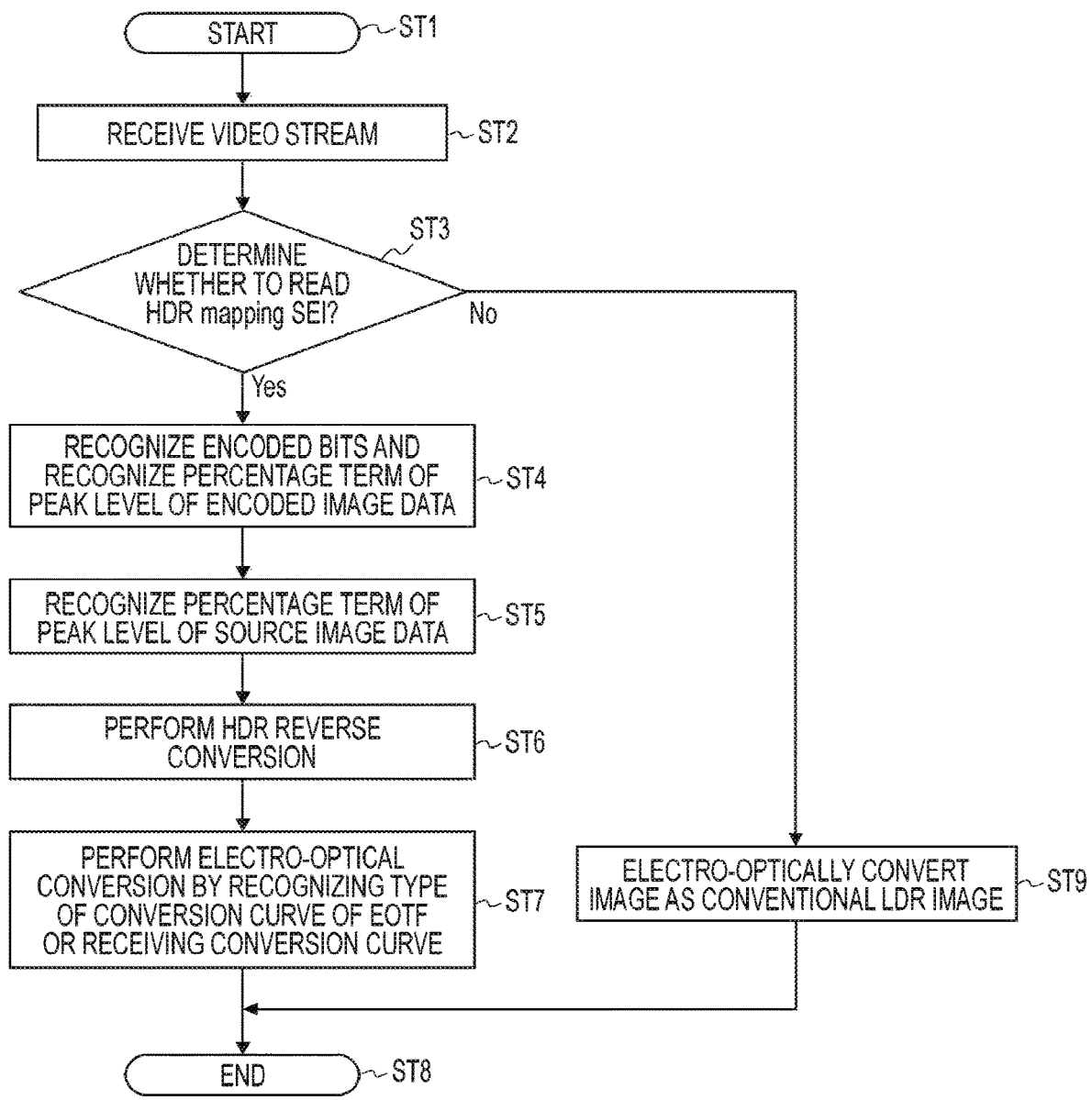
FIG. 19 is a flowchart of an exemplary flow of the process performed with the reception device.

FIG. 19 illustrates an exemplary flow of a process that the reception device 200 performs. The reception device 200 starts the process in step ST1. Subsequently, the reception device 200 receives the video stream in step ST2. Then, the reception device 200 determines whether to read the HDR mapping SEI message in step ST3. The reception device 200 determines to read the HDR mapping SEI message when the video stream includes the HDR mapping SEI message.

When determining to read the HDR mapping SEI message, the reception device 200 recognizes the encoded bits and the percentage term of the peak level of the encoded image data in step ST4. Next, the reception device 200 recognizes the percentage term of the peak level of the original image in step ST5.

Next, the reception device 200 provides the video data of the HDR image to be replayed by performing HDR reverse conversion in accordance with the level-mapping curve information included in the HDR mapping SEI message in step ST6. The reception device 200 provides the video data for display by recognizing the type of the conversion curve of the electro-optical conversion (EOTF) or receiving the conversion curve of the electro-optical conversion (EOTF) specialized for a specific image, and performing the electro-optical conversion in step ST7. The reception device 200 completes the process in step ST8 after the process in step ST7.

When determining not to read the HDR mapping SEI message in step ST3, the reception device 200 provides the video data for display by electro-optically converting the video data of the input LDR image with a conventional inverse gamma correction in step ST9 in the electro-optical conversion. The reception device 200 completes the process in step ST8 after the process in step ST9.

In the transmission and reception system 10 illustrated in FIG. 1, the transmission device 100 generates the video data for transmission of an LDR image by compressing the range of levels of the video data of the original HDR image with a specific level-mapping curve, and then transmits the video data for transmission of the LDR image as described above. Thus, for example, using a characteristic appropriate to the contents of the image as the predetermined level-mapping curve allows for good display of the LDR image from the video data for transmission on an LDR monitor.

In the transmission and reception system 10 illustrated in FIG. 1, the transmission device 100 further transmits the auxiliary information used to convert the levels on the receiving end together with the video data for transmission. This enables, for example, the receiving end to appropriately convert the levels of the video data for transmission in accordance with the auxiliary information, and thus to display the image in good condition.

In the transmission and reception system 10 illustrated in FIG. 1, the transmission device 100 transmits the electro-optical conversion characteristic information including information about a plurality of electro-optical conversion characteristics, namely, the information "eotf_table_type_main". This enables the receiving end to automatically or manually select the electro-optical conversion characteristic suitable for the environments in which the image is viewed among the electro-optical conversion characteristics and use the selected electro-optical conversion characteristic, and thus to display a high-quality image suitable for the brightness of the environment on the monitor.

2. Exemplary Variation

The example in which the HDR reverse conversion unit 205 performs the HDR reverse conversion and the electro-optical conversion unit 206 performs the electro-optical conversion in the reception device 200 has been described in the embodiment. Note that, however, for example, reflecting the HDR reverse conversion characteristic on the electro-optical conversion characteristic enables the electro-optical conversion unit 206 to solely simultaneously perform the HDR reverse conversion and the electro-optical conversion.

Figure 20:
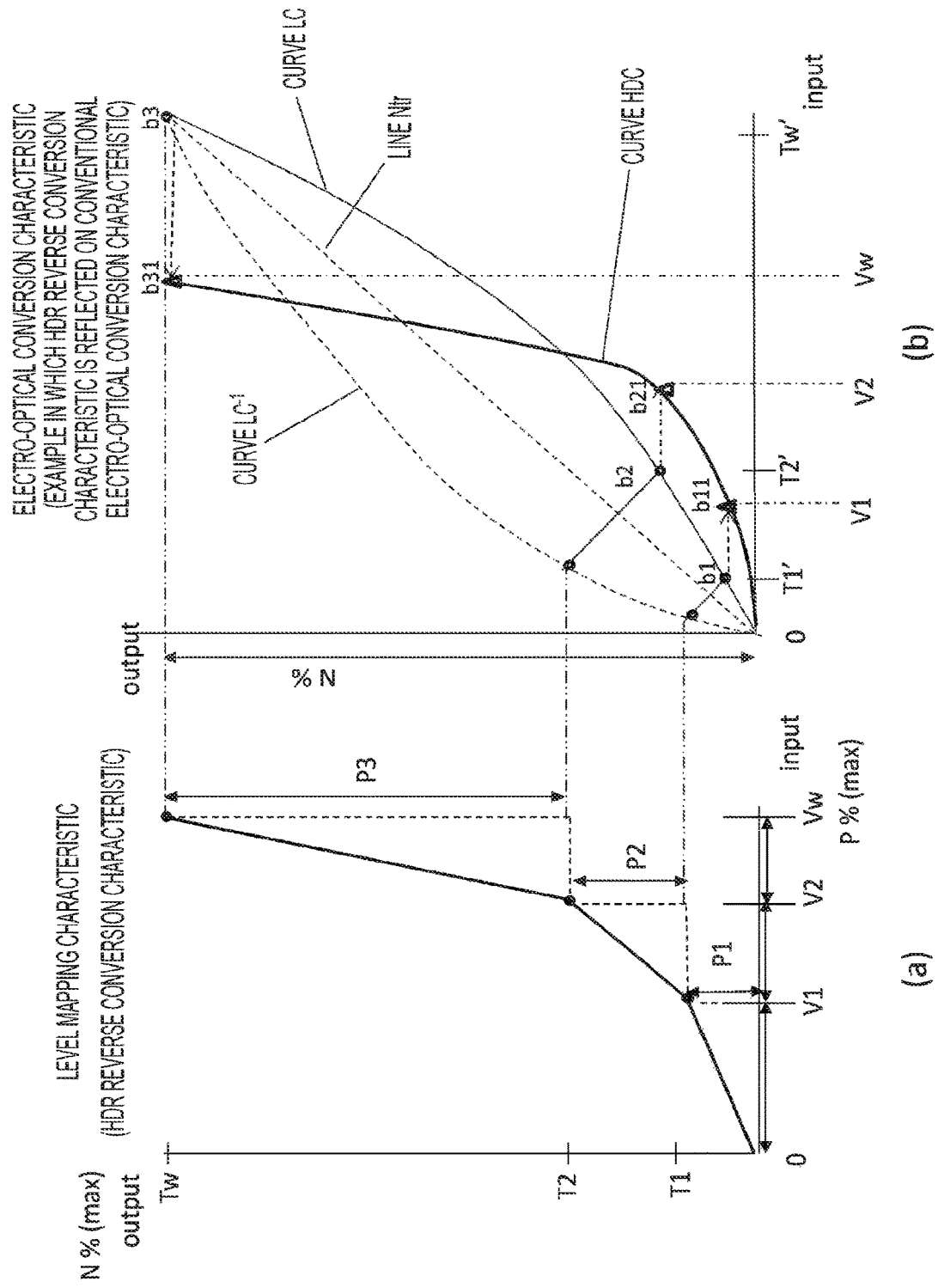
FIGS. 20(a) and 20(b) are explanatory diagrams of the electro-optical conversion characteristic on which the HDR reverse conversion characteristic is reflected.

FIG. 20(a) illustrates a level mapping characteristic (HDR reverse conversion characteristic). The level mapping characteristic is the information used to convert an LDR image into an HDR image with the correspondence between the relative levels on the compressed-level axis and the relative levels on the uncompressed-level axis. FIG. 20(b) illustrates electro-optical conversion characteristics. A curve LC indicates a conventional electro-optical conversion characteristic, and a curve HDC indicates the electro-optical conversion characteristic provided by reflecting the HDR reverse conversion characteristic on the conventional electro-optical conversion characteristic.

A process for providing the curve HDC will be described. Note that a line NTr indicates a straight line extending between the highest and lowest levels in comparison with the curves of the electro-optical conversion. A curve $LC^{-1}$ indicates the inverse characteristic, and the curve $LC^{-1}$ and the curve LC are symmetric with respect to the line NTr. The curve $LC^{-1}$ is used to transfer the characteristic between the vertical axis and horizontal axis in FIG. 20(b).

The vertical axis and horizontal axis of the HDR reverse conversion characteristic are normalized with the ratio of the highest relative level of the vertical axis to the highest relative level of the horizontal axis (the ratio of the highest values of the dynamic ranges). In that case, the ratio of the range of the vertical axis to the range of the horizontal axis is N (%) to P (%). Meanwhile, the ratio of the vertical axis in FIG. 20(a) to the horizontal axis in FIG. 20(b) is one to one. The values V1, V2, and Vw on the horizontal axis in FIG. 20(b) are identical to those on the horizontal axis in FIG. 20(a).

The values T1, T2, and Tw on the vertical axis in FIG. 20(a) are placed as the values T1', T2', and Tw' on the horizontal axis in FIG. 20(b). In FIG. 20(a), the input V1 corresponds to the output T1. In FIG. 20(b), a point b1 is plotted on the curve LC with respect to the input T1 (=T1'). The point plotted in FIG. 20(b), which satisfies the characteristic illustrated in FIG. 20(a) and the characteristic of the curve LC in FIG. 20(b), is the vertical-axis coordinate of the point b1 with respect to the V1 on the horizontal axis in FIG. 20(b). The value of the vertical-axis coordinate of the point b1 is the value of the vertical-axis coordinate of a point b11 of the V1.

The value of the vertical-axis coordinate with respect to the V2 on the horizontal axis in FIG. 20(b) is the value of the vertical-axis coordinate of a point b2 plotted on the curve LC with respect to the T2'. The value of the vertical-axis coordinate with respect to the V2 is the value of the vertical-axis coordinate of a point b21. Similarly, when the output Tw from the input Vw in FIG. 20(a) is indicated as the Tw' in FIG. 20(b), the value of the vertical-axis coordinate with respect to the Vw is the point that is the vertical-axis coordinate of the point b3 plotted on the curve LC with respect to the Tw', namely, the vertical-axis coordinate of the plotted point b31 with respect to the Vw.

When the curve found as described above and passing through the points b11, b21, and b31 is the curve HDC, the curve HDC has a characteristic simultaneously satisfying the characteristic illustrated in FIG. 20(a) and the characteristic indicated by the curve LC in FIG. 20(b). This characteristic is the electro-optical conversion characteristic solely satisfying the HDR reverse conversion and the electro-optical conversion.

Figure 21:
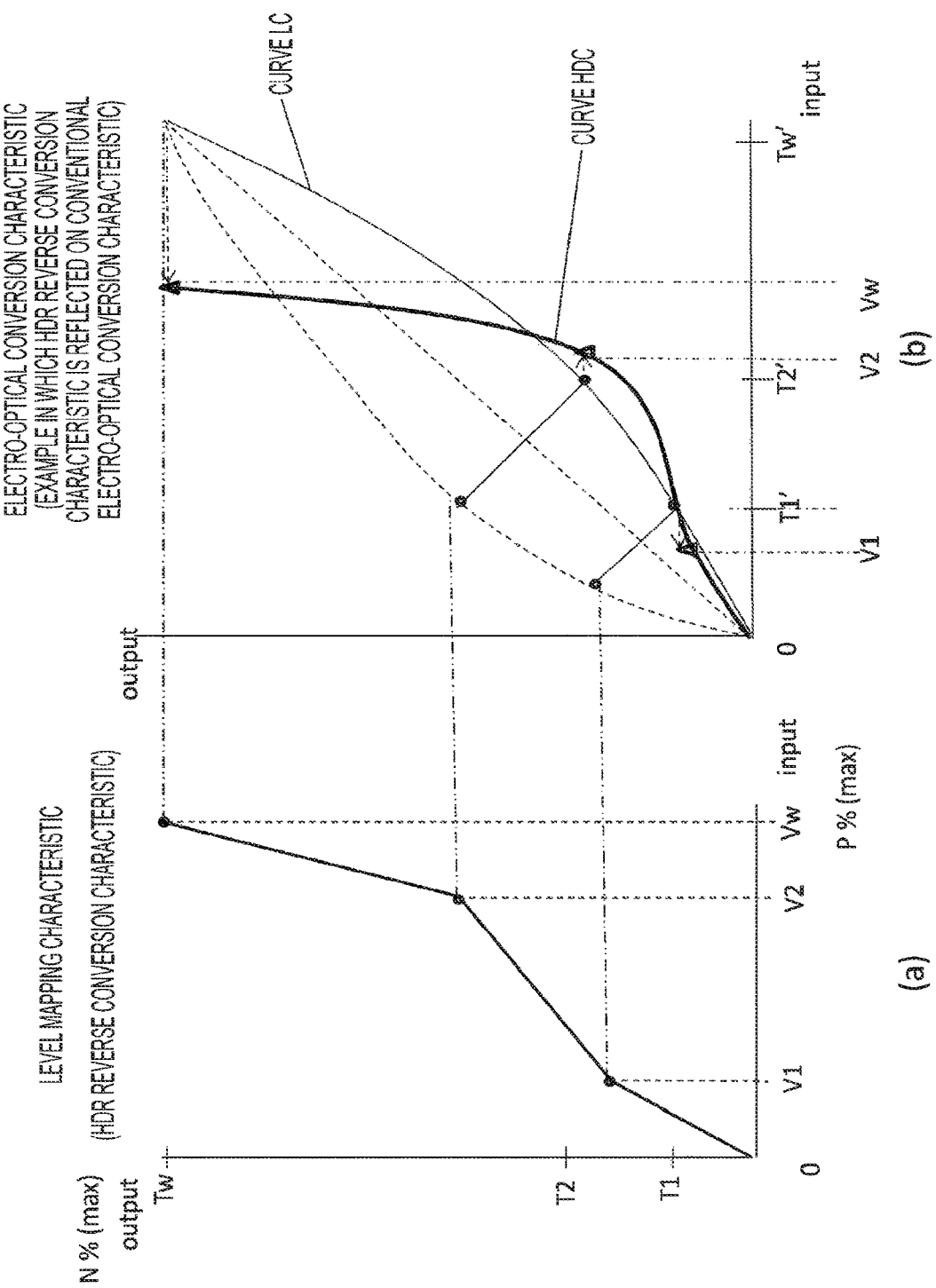
FIGS. 21(a) and 21(b) are explanatory diagrams of the electro-optical conversion characteristic on which the HDR reverse conversion characteristic is reflected.

FIG. 21(a) illustrates the level mapping characteristic (HDR reverse conversion characteristic) corresponding to the line (2) in FIG. 5. FIG. 21(b) illustrates the electro-optical conversion characteristics. A curve LC indicates a conventional electro-optical conversion characteristic, and an curve HDC indicates the electro-optical conversion characteristic provided by reflecting the HDR reverse conversion characteristic illustrated in FIG. 21(a) on the conventional electro-optical conversion characteristic. Note that the curve HDC is found in the same manner as described with reference to FIGS. 20(a) and 20(b).

The example in which the opto-electronic conversion unit 103 performs the opto-electronic conversion and the HDR conversion unit 104 performs the HDR conversion in the transmission device 200 has been described in the embodiment. However, reflecting the HDR conversion characteristic on the opto-electronic conversion characteristic enables the opto-electronic conversion unit 103 to solely simultaneously perform the opto-electronic conversion and the HDR conversion.

Figure 22:
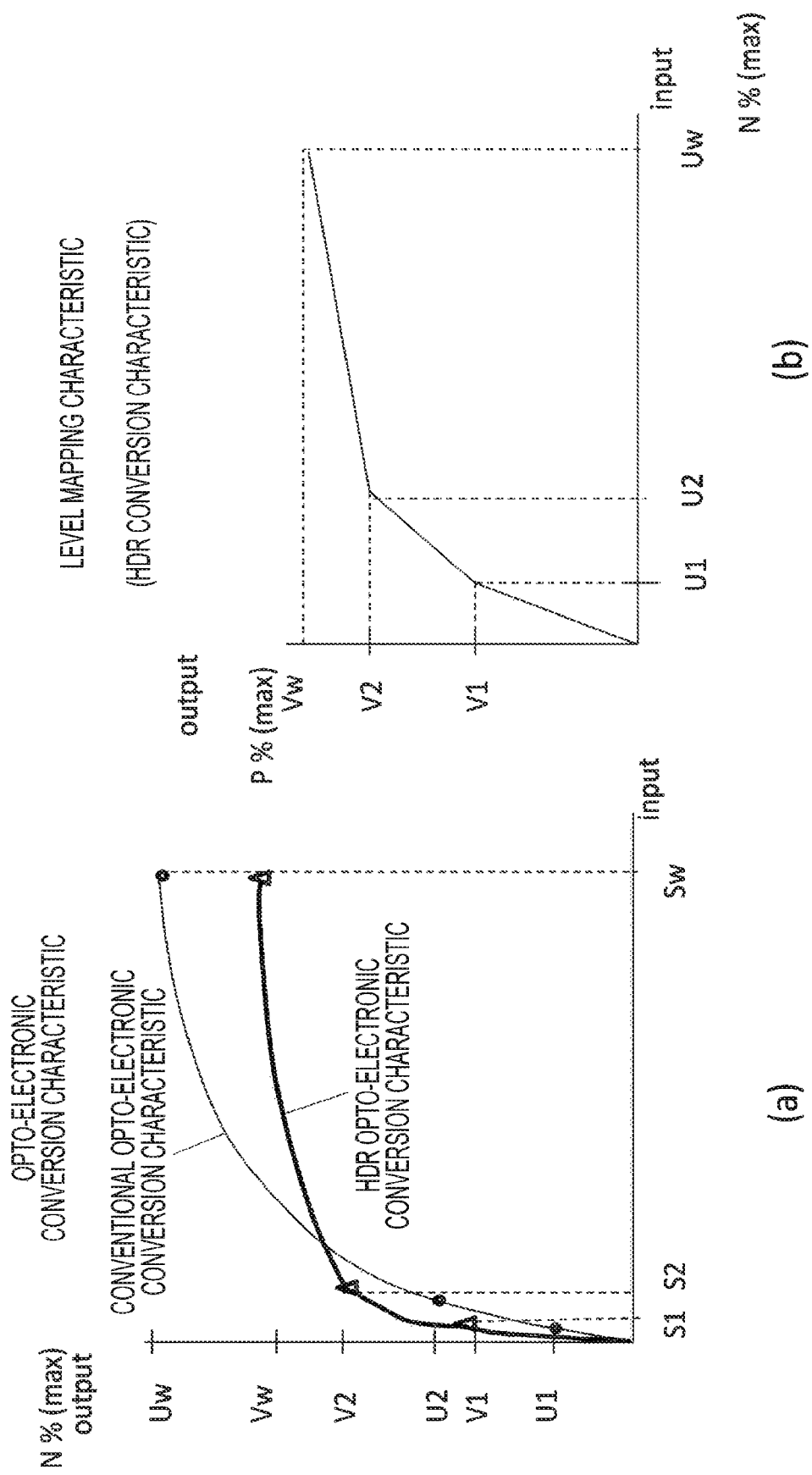
FIGS. 22(a) and 22(b) are explanatory diagrams of the opto-electronic conversion characteristic on which the HDR conversion characteristic is reflected.
Figure 23:
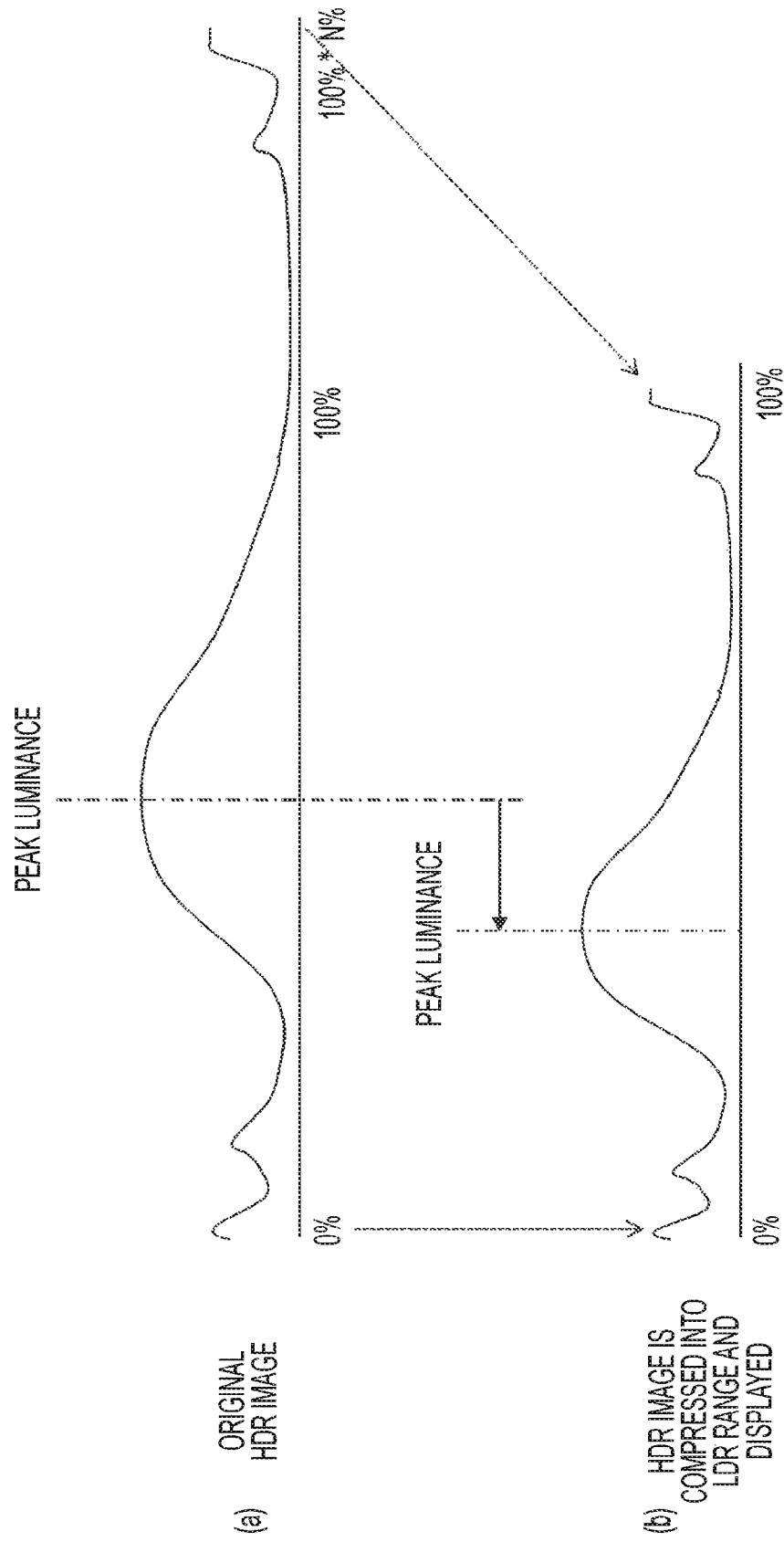
FIGS. 23(a) and 23(b) are diagrams illustrating that, when an LDR image is provided by the compression of an HDR image to an LDR range, the peak luminance of the LDR image is at a lower level than the level of the peak luminance of the HDR image.

FIG. 22(b) illustrates the level mapping characteristic (HDR conversion characteristic) corresponding to the line (1) in FIG. 3. FIG. 22(a) illustrates a conventional opto-electronic conversion characteristic, and the HDR opto-electronic conversion characteristic provided by reflecting the HDR conversion characteristic illustrated in FIG. 22(b) on the conventional opto-electronic conversion characteristic. Note that, although omitting the detailed description, the HDR opto-electronic conversion characteristic is found in the same manner as the manner to find the electro-optical conversion characteristic (curve HDC) on which the HDR reverse conversion characteristic is reflected.

Note that the example in which the HDR conversion unit 104 in the transmission device 100 converts an HDR image into an LDR image and the transmission device 100 transmits the parameters for the HDR conversion (the level-mapping curve information) together with the LDR image, and the HDR reverse conversion unit 205 converts the LDR image into an HDR image in accordance with the transmitted parameters and displays the HDR image in the reception device 200 has been described in the embodiment.

However, in a similar method, the transmission device 100 can transmit the parameters used to convert an HDR image into an LDR image together with the HDR image, without converting the HDR image into the LDR image with the HDR conversion unit 104 in the transmission device 100, and the HDR reverse conversion unit 205 can convert the received HDR image into an LDR image in accordance with the parameters and display the LDR image in the reception device 200. In such a case, when the level-mapping characteristic is reflected on the electro-optical conversion characteristic of the receiver, the electro-optical conversion characteristic of the receiver includes a characteristic to convert HDR into the LDR and the conventional electro-optical conversion characteristic.

Furthermore, the present invention can also be configured as follows.

(1)

A transmission device including:

a level conversion unit that provides video data for transmission in a second range of levels narrower than or equal to a first range of levels by applying a predetermined level-mapping curve to input video data in the first range of levels; and a transmission unit that transmits the video data for transmission together with auxiliary information used to convert the levels on a receiving end.

(2)

The transmission device according to (1), wherein the transmission unit transmits a video stream provided by encoding the video data for transmission, and the auxiliary information is inserted in a layer of the video stream.

(3)

The transmission device according to (1) or (2), wherein the first range of levels is between zero and N %, the N is a number larger than 100, and the second range of levels is between zero and P %, the P is a number larger than or equal to 100 and smaller than or equal to the N.

(4)

The transmission device according to any one of (1) to (3), wherein the auxiliary information is level-mapping curve information and/or electro-optical conversion characteristic information.

(5)

The transmission device according to (4), wherein the electro-optical conversion characteristic information that the transmission unit transmits together with the video data for transmission includes information of a plurality of electro-optical conversion characteristics.

(6)

A transmission method including:

converting levels by applying a predetermined level-mapping curve to input video data in a first range of levels in order to provide video data for transmission in a second range of levels narrower than the first range of levels; and transmitting, with a transmission unit, the video data for transmission together with auxiliary information used to convert the levels on a receiving end.

(7)

A reception device including:

a reception unit that receives video data for transmission in a second range of levels narrower than or equal to a first range of levels, the video data for transmission being provided by applying a predetermined level-mapping curve to input video data in the first range of levels; and a processing unit that converts the levels of the video data for transmission in accordance with auxiliary information received together with the video data for transmission.

(8)

The reception device according to (7), wherein the auxiliary information is level-mapping curve information and/or electro-optical conversion characteristic information.

(9)

The reception device according to (8), wherein the processing unit converts the video data for transmission in the second range of levels into video data for output in a third range of levels wider than or equal to the second range of levels in accordance with the level-mapping curve information.

(10)

The reception device according to (9), wherein the first range of levels is between zero and N %, the N is a number larger than 100, the second range of levels is between zero and P %, the P is a number larger than or equal to 100 and smaller than or equal to the N, and the third range of levels is between zero and Q %, the Q is a number larger than or equal to 100 and smaller than or equal to the N.

(11)

The reception device according to (9) or (10), wherein a highest level in the third range of levels is determined in accordance with information about a highest level able to be displayed.

(12)

The reception device according to anyone of (8) to (11), wherein the processing unit provides video data for output by electro-optically converting the video data for transmission in the second range of levels or video data in a third range of levels wider than or equal to the second range of levels in accordance with the electro-optical conversion characteristic information in electro-optical conversion, and the video data in the third range of levels is provided by converting the levels of the video data for transmission in accordance with the level-mapping curve information.

(13)

The reception device according to anyone of (8) to (12), further including:

a selection unit that selects an electro-optical conversion characteristic used in the processing unit among a plurality of electro-optical conversion characteristics, wherein the electro-optical conversion characteristic information received together with the video data for transmission includes information of the electro-optical conversion characteristics.

(14)

The reception device according to (13), wherein the selection unit selects an electro-optical conversion characteristic used in the processing unit among the electro-optical conversion characteristics in accordance with an output from a sensor or an input by user operation.

(15)

A reception method including:

receiving, with a reception unit, video data for transmission in a second range of levels narrower than a first range of levels, the video data for transmission being provided by applying a predetermined level-mapping curve to input video data in the first range of levels; and converting the levels of the video data for transmission in accordance with auxiliary information received together with the video data for transmission.

A main aspect of the present invention is to enable the receiving end to display an LDR image in good condition by transmitting the video data for transmission of the LDR image generated by applying a specific level-mapping curve to the video data of the original HDR image (see FIGS. 2(a) and 2(b), and FIG. 7). Another main aspect of the present invention is to enable the receiving end to appropriately convert the levels in the level converting process and thus to display an image in good condition by transmitting the auxiliary information used to convert the levels on the receiving end together with the video data for transmission (see FIGS. 4(a) to 4(c), and FIG. 15).

REFERENCE SIGNS LIST

10 Transmission and reception system
100 Transmission device
101 Control unit
102 Camera
103 Opto-electronic conversion unit
104 HDR conversion unit
105 Video encoder
106 System encoder
107 Transmission unit
200 Reception device
201 Control unit
202 Reception unit
203 System decoder
204 Video decoder
205 HDR reverse conversion unit
206 Electro-optical conversion unit
207 Display unit

The invention claimed is:

1. A transmission device comprising:

circuitry including at least a processor, the circuitry configured to:

receive video data in a first range of levels, the first range of levels being between zero and N %, N is a number larger than 100;

select a level-mapping curve from a set of level-mapping curves, the set of level-mapping curves including at least a first level-mapping curve in which a first part of an image is more finely expressed than a second part and a third part of the image, the first range of levels being divided by the first level-mapping curve into at least three ranges, a first level range, a second level range, and a third level range, the first level range being converted into a range with the largest number of levels, a second level-mapping curve in which the second part of the image is more finely expressed than the first part and the third part of the image, and a third-level mapping curve in which the first, second, and third parts of the image are evenly expressed;

process the received video data for transmission in a second range of levels narrower than or equal to the first range of levels by applying the selected level-mapping curve to the received video data in the first range of levels, the second range of levels being between zero and P %, P is a number larger than or equal to 100 and smaller than N, the selected level-mapping curve being designed to choose portions of the first range of levels at least as a first-compression range and a second-compression range, the first-compression range of the first range of levels being compressed differently from the second-compression range of the first range of levels being compressed;

transmit the processed video data together with auxiliary information used to convert the first range of levels on a receiving end, the auxiliary information including information on the selected level-mapping curve, the processed video data being displayed on a display device that is incompatible with images of the first range of levels for a user's view, the highest level of the processed video data displayed being N % when P<N<Q holds, Q being an upper limit of a third range of levels, which is wider than or equal to the second range of levels and is between zero and Q %;

converting levels between K' to P in the second range of levels into levels between K to N in the first range of levels, wherein K'<P and K<N;

multiplying a high value of a part in the first range of levels by a ratio of (N−K)/(P−K'); and displaying the multiplied high value of a part in the first range of levels.

2. The transmission device according to claim 1, wherein the circuitry is further configured to transmit a video stream provided by encoding the video data for transmission, and the auxiliary information is inserted in a layer of the video stream.

3. The transmission device according to claim 1, wherein the auxiliary information includes also electro-optical conversion characteristic information.

4. The transmission device according to claim 3, wherein the electro-optical conversion characteristic information that the circuitry transmits together with the video data for transmission includes information of a plurality of electro-optical conversion characteristics.

5. A transmission method comprising:
receiving video data in a first range of levels, the first range of levels being between zero and N %, N is a number larger than 100;
selecting a level-mapping curve from a set of level-mapping curves, the set of level-mapping curves including at least a first level-mapping curve in which a first part of an image is more finely expressed than a second part and a third part of the image, the first range of levels being divided by the first level-mapping curve into at least three ranges, a first level range, a second level range, and a third level range, the first level range being converted into a range with the largest number of levels, a second level-mapping curve in which the second part of the image is more finely expressed than the first part and the third part of the image, and a third-level mapping curve in which the first, second, and third parts of the image are evenly expressed;
processing the received video data for transmission in a second range of levels narrower than or equal to the first range of levels by applying the selected level-mapping curve to the received video data in the first range of levels, the second range of levels being between zero and P %, P is a number larger than or equal to 100 and smaller than N, the selected level-mapping curve being designed to choose portions of the first range of levels at least as a first-compression range and a second-compression range, the first-compression range of the first range of levels being compressed differently from the second-compression range of the first range of levels being compressed; and
transmitting the processed video data together with auxiliary information used to convert the first range of levels on a receiving end, the auxiliary information including information on the selected level-mapping curve, the processed video data being displayed on a display device that is incompatible with images of the first range of levels for a user's view, the highest level of the processed video data displayed being N % when P<N<Q holds, Q being an upper limit of a third range of levels, which is wider than or equal to the second range of levels and is between zero and Q %;
converting levels between $K^{\wedge \prime}$ to P in the second range of levels into levels between K to N in the first range of levels, wherein $K^{\wedge \prime}$<P and K<N;
multiplying a high value of a part in the first range of levels by a ratio of $(N-K)/(P-K^{\wedge \prime})$; and
displaying the multiplied high value of a part in the first range of levels.

6. A reception device comprising:
circuitry including at least a processor, the circuitry configured to:
receive video data for transmission in a second range of levels narrower than or equal to a first range of levels, the first range of levels being between zero and N %, N is a number larger than 100, the second range of levels being between zero and P %, P is a number larger than or equal to 100 and smaller than N, the video data for transmission being provided by receiving video data in the first range of levels, selecting a level-mapping curve from a set of level-mapping curves, the set of level-mapping curves including at least a first level-mapping curve in which a first part of an image is more finely expressed than a second part and a third part of the image, the first range of levels being divided by the first level-mapping curve into at least three ranges, a first level range, a second level range, and a third level range, the first level range being converted into a range with the largest number of levels, a second level-mapping curve in which the second part of the image is more finely expressed than the first part and the third part of the image, and a third-level mapping curve in which the first, second, and third parts of the image are evenly expressed, processing the received video data for transmission in the second range of levels narrower than or equal to the first range of levels by applying the selected level-mapping curve to the received video data in the first range of levels, the selected level-mapping curve being designed to choose portions of the first range of levels at least as a first-compression range and a second-compression range, the first-compression range of the first range of levels being compressed differently from the second-compression range of the first range of levels being compressed;
receive auxiliary information used to convert the first range of levels on a receiving end, the auxiliary information including information on the selected level-mapping curve;
convert the received video data in accordance with the auxiliary information received together with the received video data; and
display the converted video data on a display device that is incompatible with images of the first range of levels for a user's view, the highest level of the converted video data displayed being N % when P<N<Q holds, Q being an upper limit of a third range of levels, which is wider than or equal to the second range of levels and is between zero and Q %;
convert levels between $K^{\wedge \prime}$ to P in the second range of levels into levels between K to N in the first range of levels, wherein $K^{\wedge \prime}$<P and K<N;
multiply a high value of a part in the first range of levels by a ratio of $(N-K)/(P-K^{\wedge \prime \prime})$; and
display the multiplied high value of a part in the first range of levels.

7. The reception device according to claim 6, wherein the auxiliary information also includes electro-optical conversion characteristic information.

8. The reception device according to claim 7, wherein the circuitry is further configured to convert the video data in the second range of levels into video data for output in the third range of levels wider than or equal to the second range of levels in accordance with information on the selected level-mapping curve.

9. The reception device according to claim 8, wherein the highest level in the third range of levels is determined in accordance with information about the highest level able to be displayed.

10. The reception device according to claim 7, wherein the circuitry is further configured to provide video data for output by electro-optically converting the video data in the second range of levels or video data in the third range of levels wider than or equal to the second range of levels in accordance with the electro-optical conversion characteristic information in electro-optical conversion, and the video data in the third range of levels is provided by converting the video data in accordance with the information on the selected level-mapping curve.

11. The reception device according to claim 7, wherein the circuitry is further configured to select an electro-optical conversion characteristic used among a plurality of electro-optical conversion characteristics, wherein the electro-optical conversion characteristic information received together with the video data includes information of the electro-optical conversion characteristics.

12. The reception device according to claim 11, wherein the circuitry is further configured to select an electro-optical conversion characteristic used among the electro-optical conversion characteristics in accordance with an output from a sensor or an input by a user operation.

13. A reception method comprising:
receiving video data for transmission in a second range of levels narrower than a first range of levels, the first range of levels being between zero and N %, N is a number larger than 100, the second range of levels being between zero and P %, P is a number larger than or equal to 100 and smaller than N, the video data for transmission being provided by receiving video data in the first range of levels, selecting a level-mapping curve from a set of level-mapping curves, the set of level-mapping curves including at least a first level-mapping curve in which a first part of an image is more finely expressed than a second part and a third part of the image, the first range of levels being divided by the first level-mapping curve into at least three ranges, a first level range, a second level range, and a third level range, the first level range being converted into a range with the largest number of levels, a second level-mapping curve in which the second part of the image is more finely expressed than the first part and the third part of the image, and a third-level mapping curve in which the first, second, and third parts of the image are evenly expressed, processing the received video data for transmission in the second range of levels narrower than or equal to the first range of levels by applying the selected level-mapping curve to the received video data in the first range of levels, the selected level-mapping curve being designed to choose portions of the first range of levels at least as a first-compression range and a second-compression range, the first-compression range of the first range of levels being compressed differently from the second-compression range of the first range of levels being compressed;
receiving auxiliary information used to convert the first range of levels on a receiving end, the auxiliary information including information on the selected level-mapping curve;
converting the received video data in accordance with the auxiliary information received together with the received video data; and
displaying the converted video data on a display device that is incompatible with images of the first range of levels for a user's view, the highest level of the converted video data displayed being N % when P<N<Q holds, Q being an upper limit of a third range of levels, which is wider than or equal to the second range of levels and is between zero and Q %;
converting levels between $K^{\wedge 1}$ to P in the second range of levels into levels between K to N in the first range of levels, wherein $K^{\wedge 1}$<P and K<N;
multiplying a high value of a part in the first range of levels by a ratio of $(N-K)/(P-K^{\wedge 1})$; and
displaying the multiplied high value of a part in the first range of levels.

14. The transmission device according to claim 1, wherein the highest level of the processed video data displayed is Q % when P<Q<N holds.

* * * * *